(12) United States Patent
Mantes et al.

(10) Patent No.: US 11,110,533 B2
(45) Date of Patent: Sep. 7, 2021

(54) SOLDERING TOOL

(71) Applicant: MILWAUKEE ELECTRIC TOOL CORPORATION, Brookfield, WI (US)

(72) Inventors: Jonathan M. Mantes, Franklin, WI (US); Justin D. Dorman, Wauwatosa, WI (US); Tin Pak Lee, Kwai Chung (HK); Siu Kwong Yu, Kwai Chung (HK); Kyle Harvey, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 702 days.

(21) Appl. No.: 15/794,069

(22) Filed: Oct. 26, 2017

(65) Prior Publication Data
US 2018/0111213 A1 Apr. 26, 2018

Related U.S. Application Data

(60) Provisional application No. 62/454,313, filed on Feb. 3, 2017, provisional application No. 62/412,900, filed on Oct. 26, 2016.

(51) Int. Cl.
*B23K 3/03* (2006.01)
*B23K 3/02* (2006.01)

(52) U.S. Cl.
CPC ............ *B23K 3/0323* (2013.01); *B23K 3/027* (2013.01); *B23K 3/033* (2013.01); *B23K 3/0346* (2013.01); *B23K 3/0361* (2013.01)

(58) Field of Classification Search
None
See application file for complete search history.

(56) References Cited

U.S. PATENT DOCUMENTS

| | | | | | |
|---|---|---|---|---|---|
| 3,480,759 | A | * | 11/1969 | Sachs Ernst | B23K 3/0615 219/242 |
| 4,050,003 | A | * | 9/1977 | Owings | B25F 3/00 320/113 |
| 4,779,786 | A | * | 10/1988 | Holdway | B23K 1/018 219/230 |

(Continued)

FOREIGN PATENT DOCUMENTS

TW I263554 B 10/2006
TW M356572 U 5/2009

(Continued)

OTHER PUBLICATIONS

International Search Report and Written Opinion for Application No. PCT/US2017/058390 dated Jan. 23, 2018, 19 pages.

(Continued)

*Primary Examiner* — Joseph M. Pelham
(74) *Attorney, Agent, or Firm* — Michael Best & Friedrich LLP

(57) ABSTRACT

A soldering tool includes a housing having a handle portion defining a first longitudinal axis, and a head portion coupled to the handle portion and defining a second axis. The soldering tool further includes a heating element coupled to the head portion for movement therewith. The head portion is movable relative to the handle portion between a first orientation in which the second axis is coaxial with the first axis, and a second orientation in which the second axis is non-coaxial with the first axis.

22 Claims, 23 Drawing Sheets

(56) References Cited

U.S. PATENT DOCUMENTS

| | | | |
|---|---|---|---|
| 4,912,349 A * | 3/1990 | Chang | B25F 5/02 |
| | | | 173/170 |
| 5,446,262 A | 8/1995 | McCambridge | |
| 6,054,678 A | 4/2000 | Miyazaki | |
| 6,087,631 A | 7/2000 | Miyazaki | |
| 6,102,134 A * | 8/2000 | Alsruhe | B25F 5/02 |
| | | | 173/170 |
| 6,131,791 A | 10/2000 | Masaki | |
| 6,147,325 A | 11/2000 | Eisele | |
| 6,201,930 B1 | 3/2001 | Close et al. | |
| 6,215,104 B1 | 4/2001 | Kurpiela et al. | |
| 6,257,478 B1 | 7/2001 | Straub | |
| 6,329,641 B1 | 12/2001 | Miyazaki et al. | |
| 6,386,423 B1 | 5/2002 | Adler et al. | |
| 6,710,304 B2 | 3/2004 | Yokoo | |
| 6,750,431 B2 | 6/2004 | Miyazaki | |
| 6,786,386 B2 | 9/2004 | Miyazaki | |
| 6,817,424 B1 * | 11/2004 | Su | B25F 5/02 |
| | | | 173/216 |
| 6,818,862 B2 | 11/2004 | Uetani et al. | |
| 6,831,252 B1 * | 12/2004 | Crookshanks | B23K 3/0369 |
| | | | 219/229 |
| 6,833,531 B1 | 12/2004 | Masaki | |
| 6,916,859 B2 | 7/2005 | Hirofumi | |
| 6,972,396 B2 | 12/2005 | Miyazaki | |
| 7,030,339 B2 | 4/2006 | Nagase et al. | |
| D528,385 S * | 9/2006 | Netzler | D8/61 |
| 7,126,086 B2 | 10/2006 | Konishi et al. | |
| 7,131,858 B1 | 11/2006 | Zerebilov | |
| 7,259,356 B2 | 8/2007 | Cowell et al. | |
| 7,269,892 B2 | 9/2007 | Miyazaki | |
| D554,461 S * | 11/2007 | Kokawa | D8/61 |
| 7,325,714 B2 | 2/2008 | Mochizuki | |
| D586,195 S * | 2/2009 | Okuda | D8/61 |
| 7,490,751 B2 | 2/2009 | Nagase et al. | |
| 7,679,032 B2 | 3/2010 | Masaki | |
| 7,807,949 B2 | 10/2010 | Miyazaki | |
| 7,860,378 B2 | 12/2010 | Teraoka | |
| 7,886,954 B2 | 1/2011 | Mochizuki | |
| 8,237,091 B2 | 8/2012 | Yoshimura et al. | |
| 8,274,011 B2 | 9/2012 | Masaki | |
| 8,276,855 B2 | 10/2012 | Teraoka | |
| 8,556,570 B2 | 10/2013 | Ishihara | |
| 8,569,657 B2 | 10/2013 | Yoshimura et al. | |
| 9,168,605 B2 | 10/2015 | Miyazaki et al. | |
| 9,314,863 B2 | 4/2016 | Teraoka | |
| 9,327,361 B2 | 5/2016 | Marino et al. | |
| 9,339,884 B2 * | 5/2016 | Tsai | B23K 3/0353 |
| 2004/0069512 A1 * | 4/2004 | Ng | B25F 5/02 |
| | | | 173/216 |
| 2004/0231170 A1 * | 11/2004 | Neitzell | B23D 51/01 |
| | | | 30/340 |
| 2006/0267548 A1 * | 11/2006 | Uehlein-Proctor | H02J 7/0045 |
| | | | 320/107 |
| 2006/0267556 A1 * | 11/2006 | Uehlein-Proctor | B25F 5/00 |
| | | | 320/132 |
| 2010/0046211 A1 * | 2/2010 | Spartano | F21V 15/01 |
| | | | 362/157 |
| 2013/0105466 A1 | 5/2013 | Teraoka | |
| 2014/0091075 A1 * | 4/2014 | Liu | B29C 65/342 |
| | | | 219/209 |
| 2014/0131059 A1 | 5/2014 | Verbrugge et al. | |
| 2015/0083707 A1 | 3/2015 | Miyazaki et al. | |
| 2015/0125334 A1 | 5/2015 | Uetani et al. | |
| 2015/0246404 A1 | 9/2015 | Teraoka et al. | |
| 2015/0271912 A1 | 9/2015 | Tetsuo et al. | |
| 2016/0031044 A1 | 2/2016 | Marino et al. | |
| 2016/0175958 A1 | 6/2016 | Mochizuki | |
| 2016/0175959 A1 | 6/2016 | Mochizuki et al. | |
| 2016/0221098 A1 | 8/2016 | Marino et al. | |
| 2020/0009672 A1 * | 1/2020 | Wu | B25G 1/10 |

FOREIGN PATENT DOCUMENTS

| | | |
|---|---|---|
| TW | M444894 U | 1/2013 |
| WO | 9508200 | 3/1995 |

OTHER PUBLICATIONS

European Patent Office Extended Search Report for Application No. 17866175.7 dated Jun. 17, 2020 (9 pages).

* cited by examiner

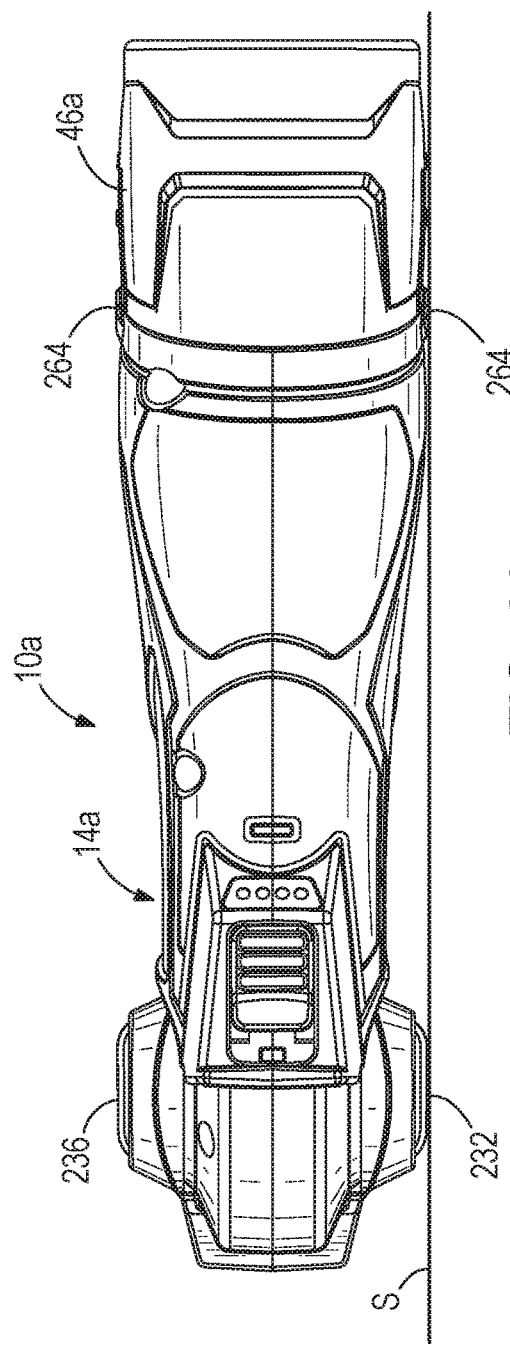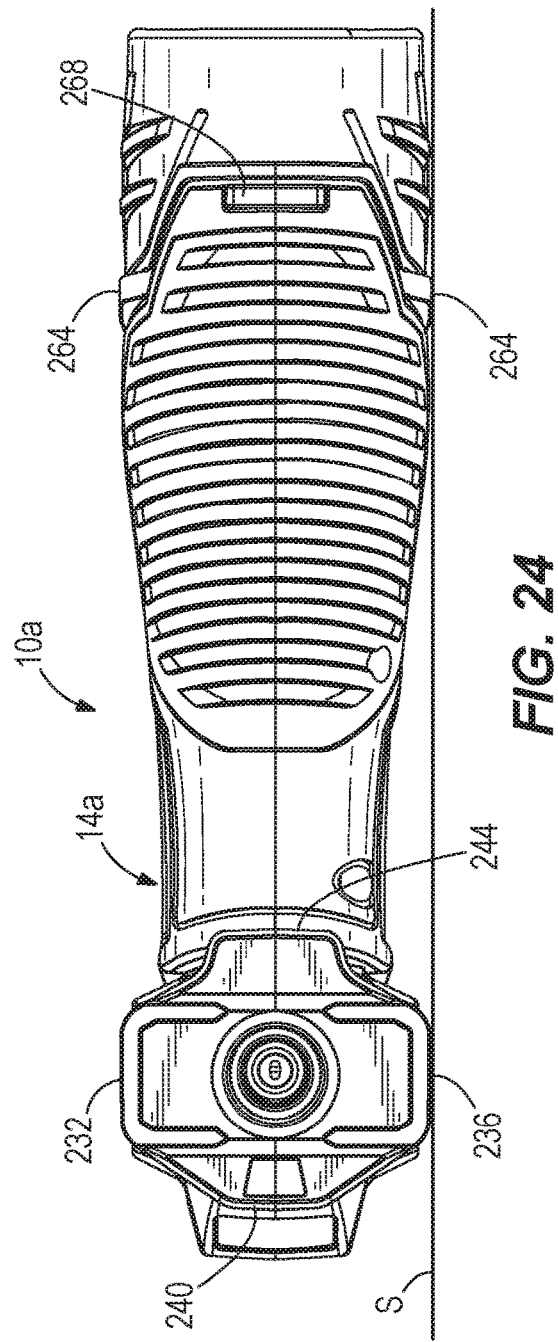

SOLDERING TOOL

CROSS-REFERENCE TO RELATED APPLICATIONS

This application claims priority to U.S. Provisional Patent Application No. 62/412,900 filed on Oct. 26, 2016 and U.S. Provisional Patent Application No. 62/454,313 filed on Feb. 3, 2017, the entire contents of which are incorporated herein by reference.

FIELD OF THE INVENTION

The present invention relates to soldering tools, and more particularly to configurable soldering tools.

BACKGROUND OF THE INVENTION

Typically, soldering tools include a heated metal tip that is heated by a resistive heating element electrically connected to a power source. The heated metal tip is typically used to heat and melt solder to be applied to or removed from a joint of a workpiece. Generally, soldering tools may be soldering iron-type tools in which the heated metal tip extends parallel to a handle portion of the housing, or soldering gun-type tools in which the heated metal tip extends generally perpendicular to the handle portion of the housing so as to have a pistol shape. Depending on the situation it may be more desirable to use a soldering iron-type tool or a soldering gun-type tool.

SUMMARY OF THE INVENTION

The present invention provides, in one aspect, a soldering tool including a housing having a handle portion defining a first longitudinal axis, and a head portion coupled to the handle portion and defining a second axis. The soldering tool further includes a heating element coupled to the head portion for movement therewith. The head portion is movable relative to the handle portion between a first orientation in which the second axis is coaxial with the first axis, and a second orientation in which the second axis is non-coaxial with the first axis.

The present invention provides, in another aspect, a soldering tool including a housing having a battery attachment portion, a heating element coupled to the housing, and a power tool battery pack. The power tool battery pack is removably coupled to the battery attachment portion of the housing to provide power to heat the heating element. The power tool battery pack also is connectable to other power tools to provide power thereto.

The present invention provides, in yet another aspect, a soldering tool assembly including a soldering tool having a heating element, a first battery pack removably connectable to the soldering tool for supplying current to the heating element, and a second battery pack removably connectable to the soldering tool for supplying current to the heating element. The first and second battery packs have different footprints when supported upon a support surface. The soldering tool assembly also includes a stand having a first battery pack recess in which the first battery pack is at least partially receivable when attached to the soldering tool, the first battery pack recess having a shape corresponding to the footprint of the first battery pack, and a second battery pack recess in which the second battery pack is at least partially receivable when attached to the soldering tool, the second battery pack recess having a shape corresponding to the footprint of the second battery pack.

Other features and aspects of the invention will become apparent by consideration of the following detailed description and accompanying drawings.

BRIEF DESCRIPTION OF THE DRAWINGS

FIG. 23 is a side view of the soldering tool of FIG. 13 in a third configuration, supported by the second side of the collar.

FIG. 24 is a side view of the soldering tool of FIG. 13 in the third configuration supported by the third side of the collar.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
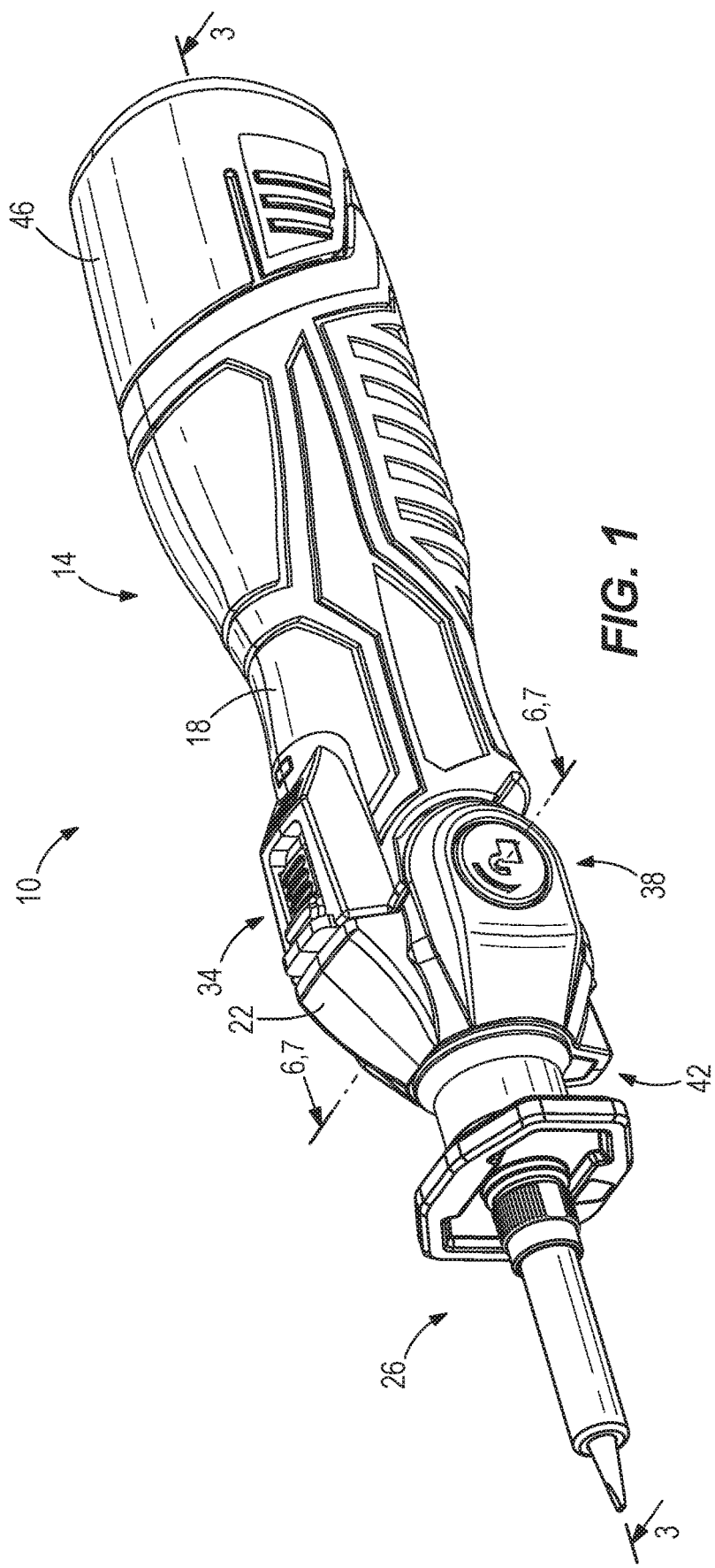
FIG. 1 is a perspective view of a soldering tool in accordance with an embodiment of the invention.
Figure 2:
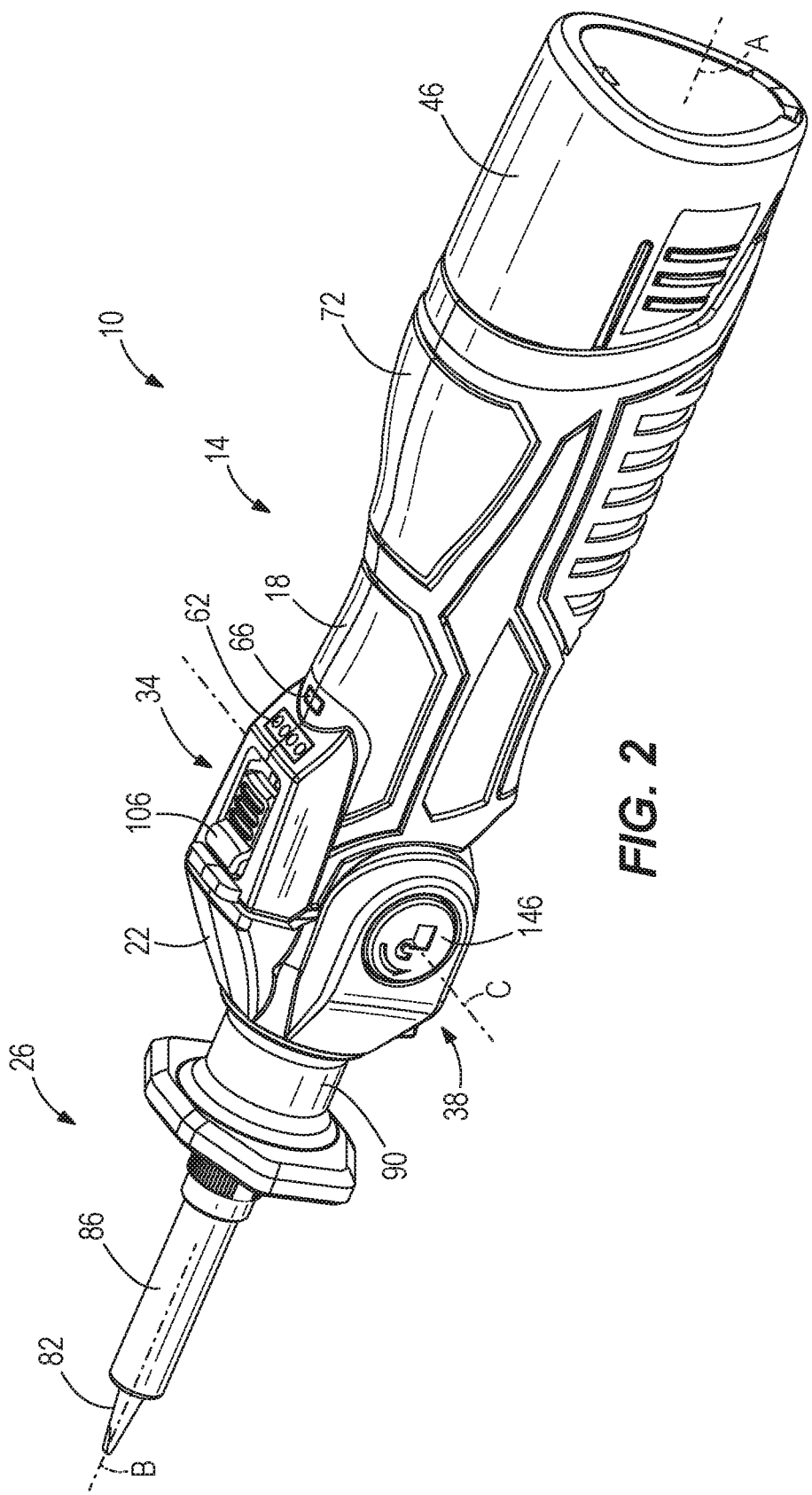
FIG. 2 is another perspective view of the soldering tool of FIG. 1.
Figure 8:
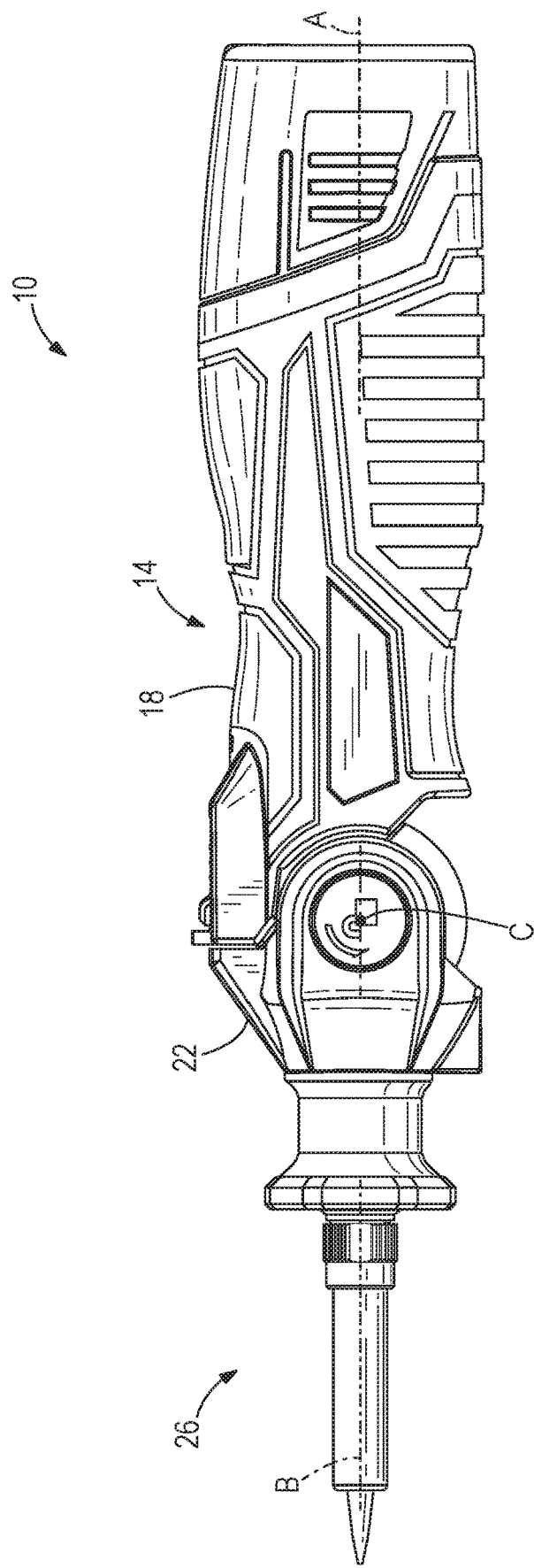
FIG. 8 is a side view of the soldering tool of FIG. 1 in a first configuration
Figure 9:
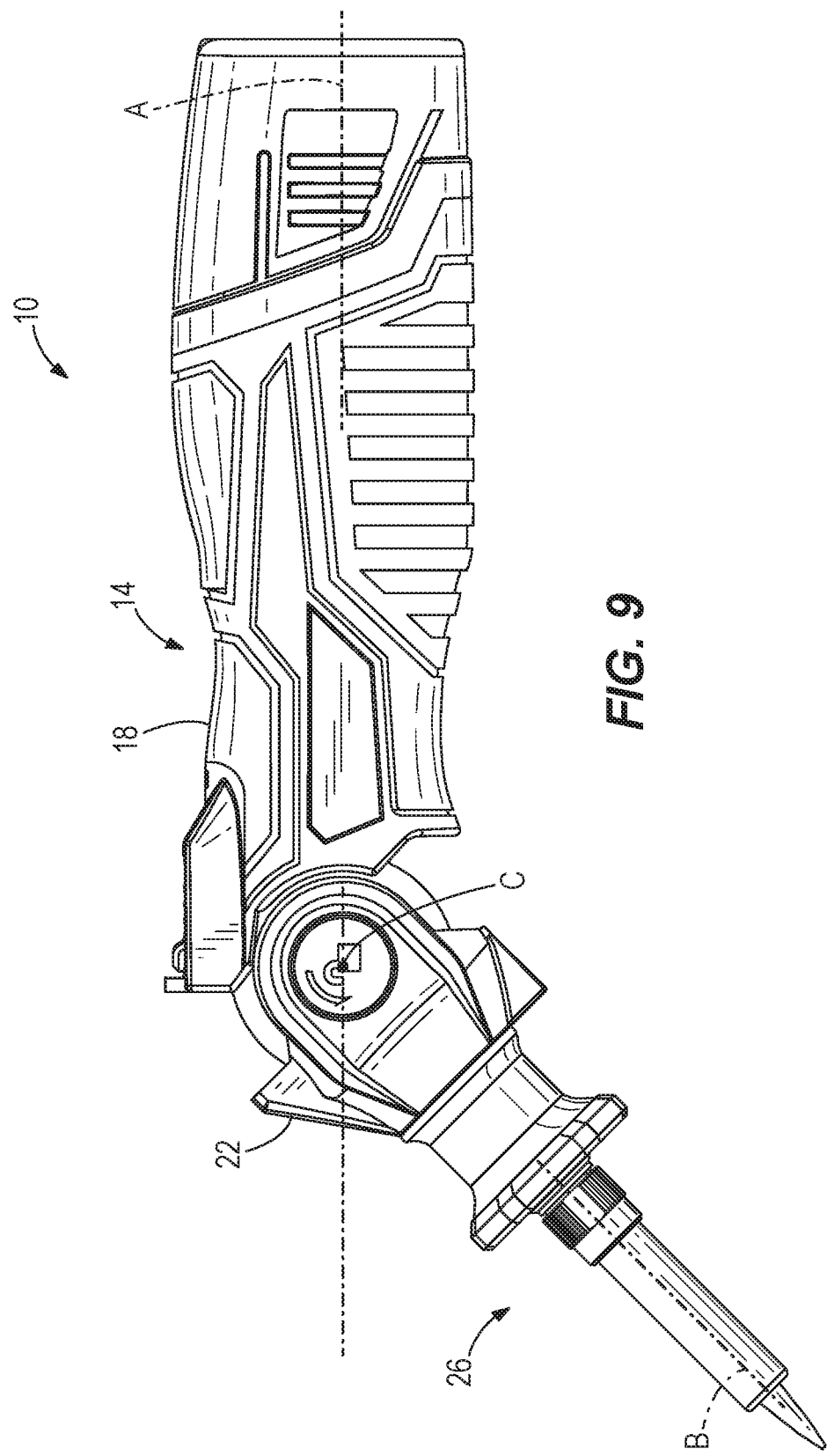
FIG. 9 is a side view of the soldering tool of FIG. 1 in a second configuration

FIGS. 1 and 2 illustrate a soldering tool 10 for heating and melting solder to be applied to or removed from a workpiece. The soldering tool 10 is configurable between various orientations, such as a soldering iron configuration (FIG. 8), a soldering gun configuration (FIG. 10), and an intermediate configuration (FIG. 9). The soldering tool 10 includes a housing 14 having a handle portion 18 defining a longitudinal axis A (FIG. 2) and a head portion 22 defining a longitudinal axis B. The head portion 22 is selectively pivotable relative to the handle portion 18 about a pivot axis C to switch between the various configurations, as described in more detail below. The pivot axis C is orthogonal to both the longitudinal axes A, B of the handle portion 18 and the head portion 22, respectively, of the housing 14. The soldering tool 10 further includes a heating assembly 26 that is coupled to the head portion 22.

With reference to FIGS. 1 and 2, the soldering tool 10 further includes a power switch assembly 34, a detent locking mechanism 38, and a work light assembly 42 (FIG. 1). The soldering tool 10 also includes a rechargeable battery pack 46 to provide power to the soldering tool 10, a controller 58 (FIG. 3), and a battery fuel gauge 62 (FIG. 2).

Figure 3:
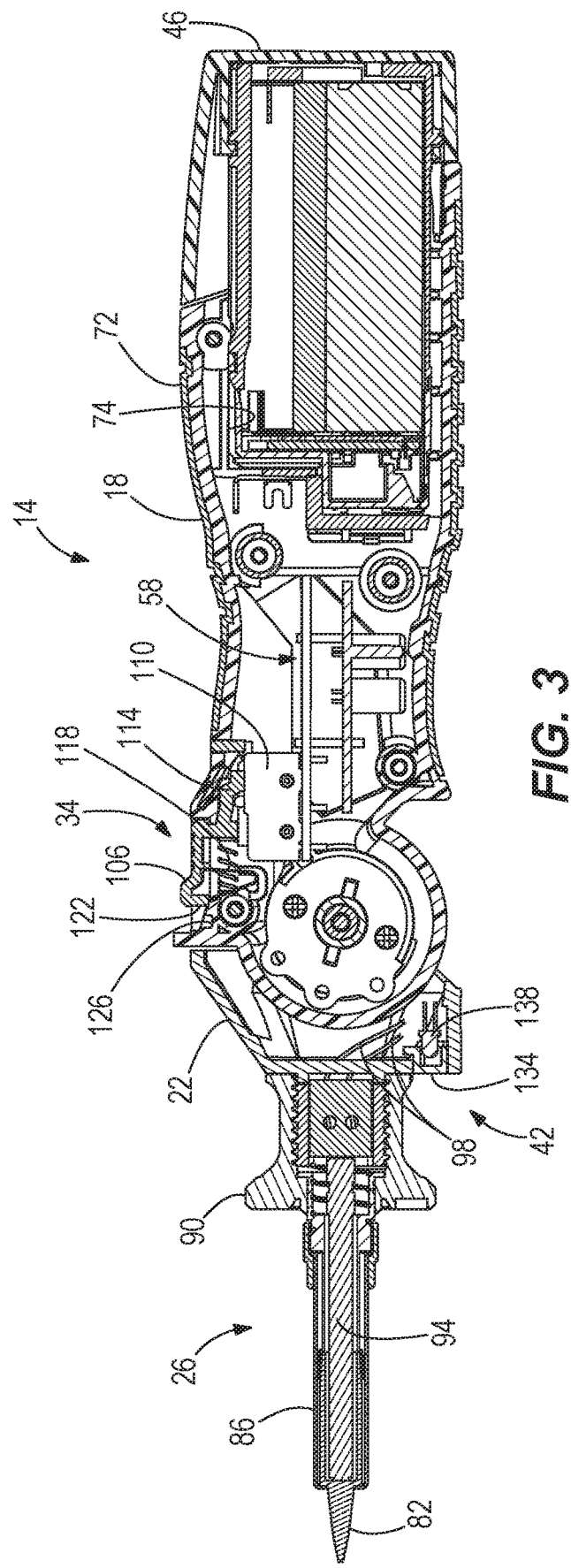
FIG. 3 is a cross-sectional view of the soldering tool of FIG. 1 through line 2-2 in FIG. 1.

With reference to FIG. 3, the handle portion 18 of the housing 14 has a battery attachment portion 72 defining a battery receptacle 74 for receiving the rechargeable battery pack 46. The battery attachment portion 72 includes electrical contacts (not shown) that electrically connect the rechargeable battery pack 46 to the controller 58. In the illustrated embodiment, the rechargeable battery pack 46 is a rechargeable power-tool battery pack, such as a lithium-ion power-tool battery pack. Accordingly, the rechargeable battery pack 46 is part of a power tool battery system such that the rechargeable battery pack 46 may be interchangeably used with other power tools (e.g., hand drills, work lights, etc) configured for use with like battery packs 46. In alternate embodiments, power may be provided to the soldering tool 10 by disposable batteries, or a permanent rechargeable battery that is non-removable from the receptacle 74, in lieu of the rechargeable battery pack 46. In further alternate embodiments, the soldering tool 10 may be powered by a standard AC power source. In such embodiments, an adaptor may be configured to be received by the battery receptacle 74 to connect the soldering tool 10 to the standard AC power source.

Referring back to FIG. 2, the battery fuel gauge 62 is provided on a top surface of the handle portion 18 of the housing 14 adjacent the power switch assembly 34 and in a visual line of sight of a user gripping the handle portion 18 during normal operation of the soldering tool 10. The battery fuel gauge 62 is an LED display that is electrically connected to the controller 58 to receive an electrical signal from the controller 58. Based on the signal, the battery fuel gauge 62 provides a visual indication of the amount of charge remaining in the battery pack 46. In some embodiments, the battery fuel gauge 62 includes a plurality of lights (e.g., LEDs) that may be independently selectively illuminated to indicate charge remaining (e.g., 4 lights lit to indicate full charge, 3 lights lit to indicate 75% charge, 2 lights lit to indicate 50% charge, etc.). In some embodiments, the battery fuel gauge 62 may provide numerical percentages to directly indicate a percentage of charge remaining (e.g., 100%, 90%, 80%, etc.). In other embodiments, the battery fuel gauge 62 may change colors to indicate the charge remaining (e.g., "green" to indicate full charge, "yellow" to indicate 75% charge, "orange" to indicate 50% charge, "red" to indicate 25% charge). In some embodiments, the battery fuel gauge 62 may also blink a color (e.g., red) to indicate that the charge in the battery pack 46 is low.

With reference to FIGS. 1-3, the heating assembly 26 includes a heated metal tip 82, an elongated insulated surround 86, and a collar or mounting portion 90 to couple the heating assembly 26 to the head portion 22 of the housing 14. The mounting portion 90 is coupled to the head portion 22 by threads. The heating assembly 26 extends along the longitudinal axis B of the head portion 22 and the heated metal tip 82 is located at a distal end thereof. The heating assembly 26 further includes a resistive heating element 94 (FIG. 3) extending along the longitudinal axis B of the head portion 22 and enclosed in the elongated insulated surround 86. The resistive heating element 94 is electrically connected by electrical leads 98 to the controller 58. Accordingly, the resistive heating element 94 may be selectively provided with a current from the battery pack 46 to heat the heating element 94. The resistive heating element 94 is in conductive thermal communication with the heated metal tip 82 such that as the temperature of the resistive heating element 94 is raised, the temperature of the heated metal tip 82 is also raised.

With continued reference to FIGS. 1-3, the power switch assembly 34 includes a sliding mechanical actuator 106, an electrical switch 110 electrically connected to the controller 58, and a switch actuating member 114 extending from the mechanical actuator 106 for actuating the electrical switch 110. The mechanical actuator 106 is movable between a first position (FIG. 11) and a second position (FIG. 12). In the first position, the switch actuating member 114 does not actuate the electrical switch 110, thus toggling the electrical switch 110 into an "off" position so that power is not provided to the heating element 94. In the second position, the switch actuating member 114 actuates the electrical switch 110, thus toggling the electrical switch 110 into an "on" position so that power is provided to the heating element 94. An actuator spring 118 is provided to bias the sliding mechanical actuator 106 into the first position and the electrical switch 110 into the "off" position. The sliding mechanical actuator 106 further includes an actuator detent 122 that is received in an actuator aperture 126 when moved into the second position to selectively retain the sliding mechanical actuator 106 in the second position and the electrical switch 110 in the "on" position. In some embodiments, the power switch assembly 34 may include a sliding potentiometer to provide varying amounts of power from the battery pack 46 to the heating element 94, and thus vary the temperature of the heating element 94 and the heated metal tip 82 (e.g., between low and high power modes).

With reference to FIGS. 2 and 3, a visual indicator 66 is provided on the handle portion 18 of the housing 14 adjacent the battery fuel gauge 62 in a visual line of sight of a user gripping the handle portion 18 of the housing 14 during normal operation of the soldering tool 10. The visual indicator 66 may include a light source such as an LED electrically connected to the controller 58. After the soldering tool 10 has been powered on, the visual indicator 66 may illuminate to indicate when the heating assembly 26 has reached a desired temperature. In addition, the visual indicator 66 may remain illuminated even after the soldering tool 10 has been powered off to indicate the head metal tip 82 is still hot, until the heated metal tip 82 has cooled to or below a pre-determined safe temperature. In some embodiments, the visual indicator 66 may illuminate a specific color (e.g., green) to indicate the desired temperature has been reached. Alternatively, or in addition, the visual indicator 66 may be illuminated to indicate when the soldering tool 10 is powered on to provide a warning to a user that the heated metal tip 82 is hot.

In some embodiments, the visual indicator 66 is configured to flash (i.e., illuminated discontinuously) a first predetermined color (e.g., green) when the soldering tool 10 is powered on. When the heating assembly 26 has reached a desired temperature, such as the melting point of solder (e.g., 400 degrees Fahrenheit), the visual indicator 66 may remain solid (i.e., be illuminated continuously) the first predetermined color while the temperature of the heating assembly 26 remains at or above the desired temperature. Once the soldering tool 10 is powered off, the visual indicator 66 switches to being continuously illuminated a second predetermined color (e.g., red). The visual indicator 66 remains illuminated the second predetermined color until either the temperature of the heating assembly 26 decreases to or below a lower limit temperature (e.g., 150 degrees Fahrenheit) or after a predetermined time has lapsed (e.g., 10 minutes), whichever occurs first.

With reference to FIG. 3, the work light assembly 42 includes a lens 134 and a light source 138 such as an LED. The lens 134 and the LED 138 are mounted in a lower portion of the head portion 22. The LED 138 is electrically connected to the controller 58 and is in electrical communication with the rechargeable battery pack 46. The lens 134 and the LED 138 are arranged such that light emitted by the LED 138 is directed generally parallel to the longitudinal axis B of the head portion 22 toward the heated metal tip 82 to illuminate the workpiece during operation. The LED 138 may be activated to provide illumination simultaneously with the heating assembly 26 when the electrical switch 110 is moved to the "on" position. Alternatively, the LED 138 may be activated by a third position of the sliding mechanical actuator 106 in which power is provided to both the heating assembly 26 and the LED 138. In some embodiments, the LED 138 may be turned on or off by a separate switch. In some embodiments, in addition to or in lieu of the lens 134 and the LED 138, a lens and LED may be supported by the mounting portion 90 of the heating assembly 26 to provide illumination nearer to the workpiece. In some embodiments, the lens 134 and the LED 138 are mounted in an upper portion of the head portion 22. In other embodiments, the lens 134 and the LED 138 are mounted on either side of the head portion 22. In further embodiments, any number of lenses and corresponding LEDs may be mounted about the head portion 22 in any desired arrangement.

Figure 10:
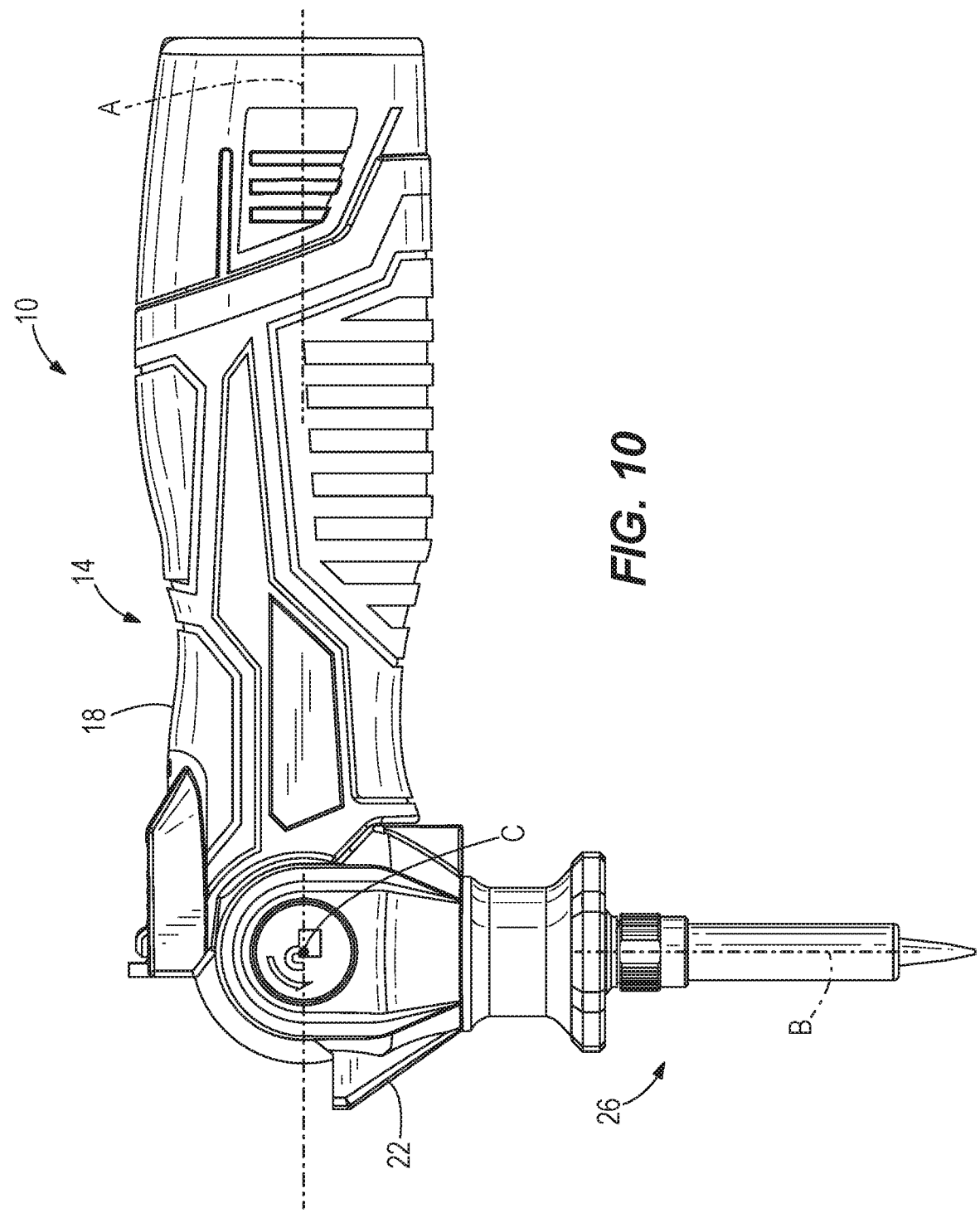
FIG. 10 is a side view of the soldering tool of FIG. 1 in a third configuration.

With reference to FIGS. 4-7, the detent locking mechanism 38 includes a push button member 146, and a push button aperture 150 defined by the head portion 22 of the housing 14 for receiving the push button member 146. The detent locking mechanism 38 is provided for selectively locking the head portion 22 in the different orientations relative to the handle portion 18 of the housing 14 (FIGS. 8-10).

Figure 4:
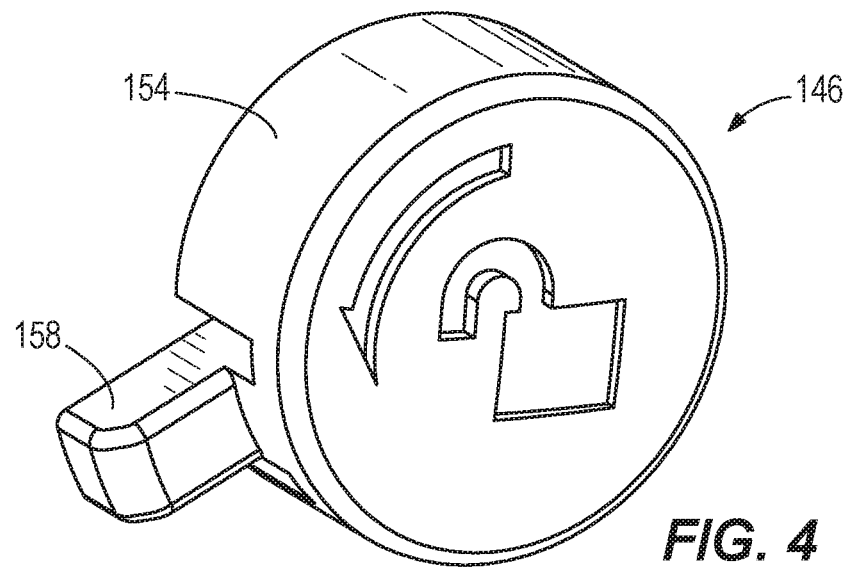
FIG. 4 is a perspective view of a detent locking button of the soldering tool of FIG. 1.

With reference to FIG. 4, the push button member 146 has a cylindrical body 154 and a detent 158 extending radially therefrom. A recess (not shown) defined by the handle portion 18 of the housing 14 receives the detent 158 and prevents the push button member 146 from rotating about the axis C. In the illustrated embodiment, the body 154 defines various indicators, such as an arrow indicating pivot direction of the head portion 22 of the housing 14 relative to the handle portion 18 and an "unlock" symbol to indicate the functionality of the push button member 146 to a user.

Figure 5:
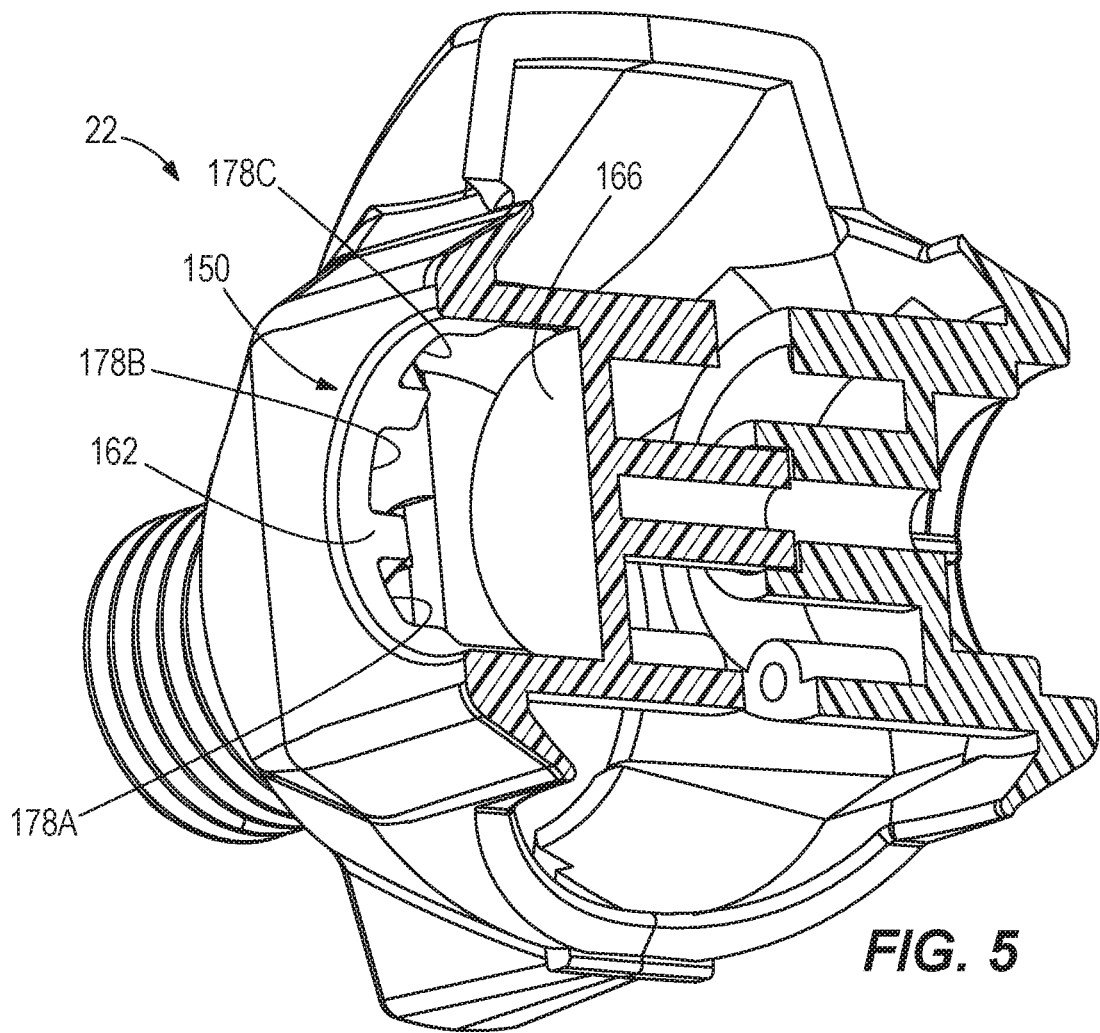
FIG. 5 is a cross-sectional perspective view of a head portion of a housing of the soldering tool of FIG. 1.
Figure 6:
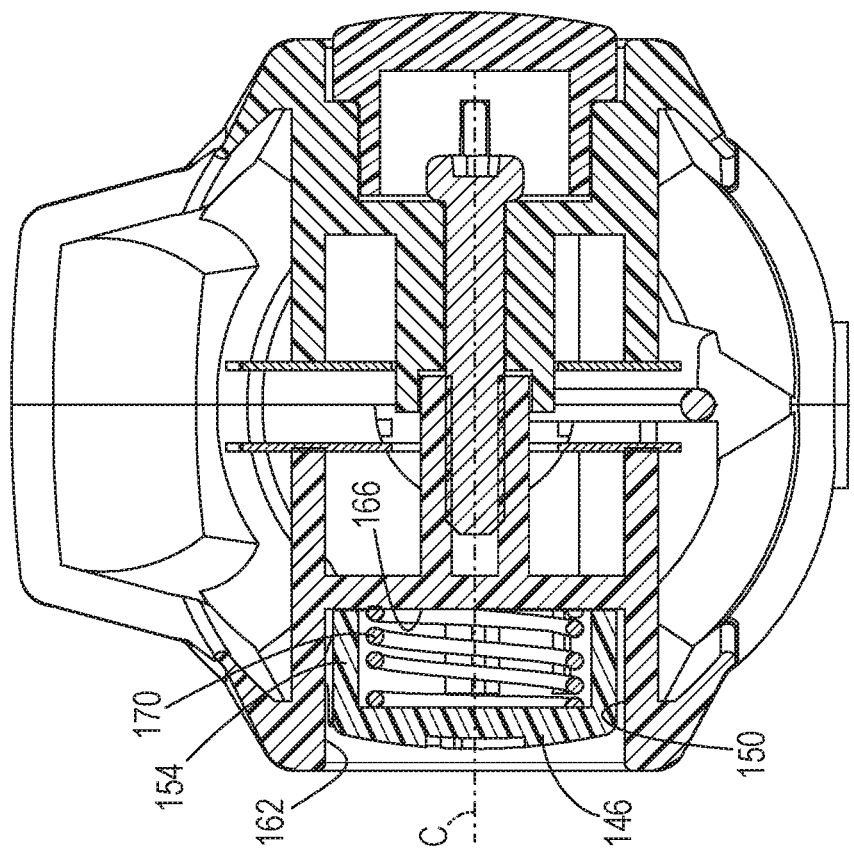
FIG. 6 is a cross-sectional view of the soldering tool of FIG. 1 through line 6-6 in FIG. 1, shown with the detent locking button in a first, biased position.

With reference to FIG. 5, the push button aperture 150 is defined along the pivot axis C of the housing 14. The head portion 22 of the housing 14 has a spring seating surface 166 within the push button aperture 150 for supporting a compression spring 170 (FIG. 6). The head portion 22 further has a circumferential wall 162 extending axially along the pivot axis C from an upper peripheral edge into the push button aperture 150 (FIG. 5). The wall 162 defines a series of notches or recesses 178A, 178B, 178C each sized to receive the detent 158 of the push button member 146 and corresponding to different orientations of the head portion 22 relative to the handle portion 18. In alternative embodiments, the recesses 178A, 178B, 178C may be defined by the body of the push button member 146 and the detent 158 extends from the wall 162 within the push button aperture 150. In the illustrated embodiment, there are three recesses 178A, 178B, 178C corresponding to three different lockable orientations. In other embodiments, there may be more or less recesses defining different discrete orientations.

With reference to FIG. 6, the compression spring 170 of the detent locking mechanism 38 is positioned within the push button aperture 150 between the push button member 146 and the spring seating surface 166. The compression spring 170 biases the push button member 146 into a first, biased, or locking position (FIG. 6), in which the detent 158 is biased into engagement with one of the recesses 178A, 178B, 178C to lock the head portion 22 in one of the discrete orientations (FIGS. 8-10) relative to the handle portion 18. The push button member 146 may be manually depressed against the bias of the compression spring 174 into a second, depressed, or unlocking position (FIG. 7), in which the detent 158 is disengaged from the recesses 178A, 178B, 178C to unlock the head portion 22 from the handle portion 18 and permit relative rotation between the head portion 22 and the handle portion 18 about the pivot axis C.

Figure 29A:
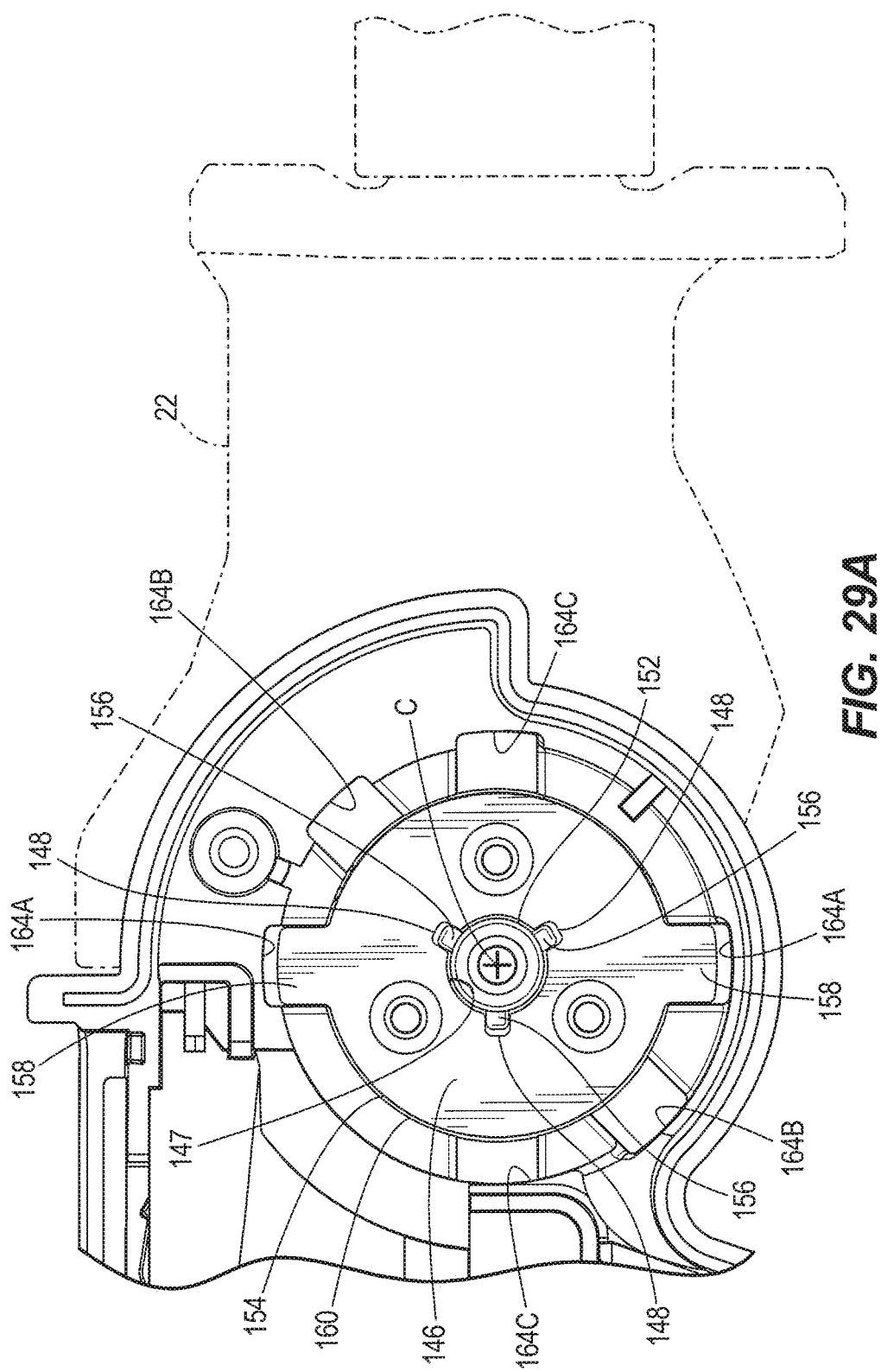
FIG. 29A is a cross-sectional view of another embodiment of the soldering tool of FIG. 1 in a first configuration.
Figure 29B:
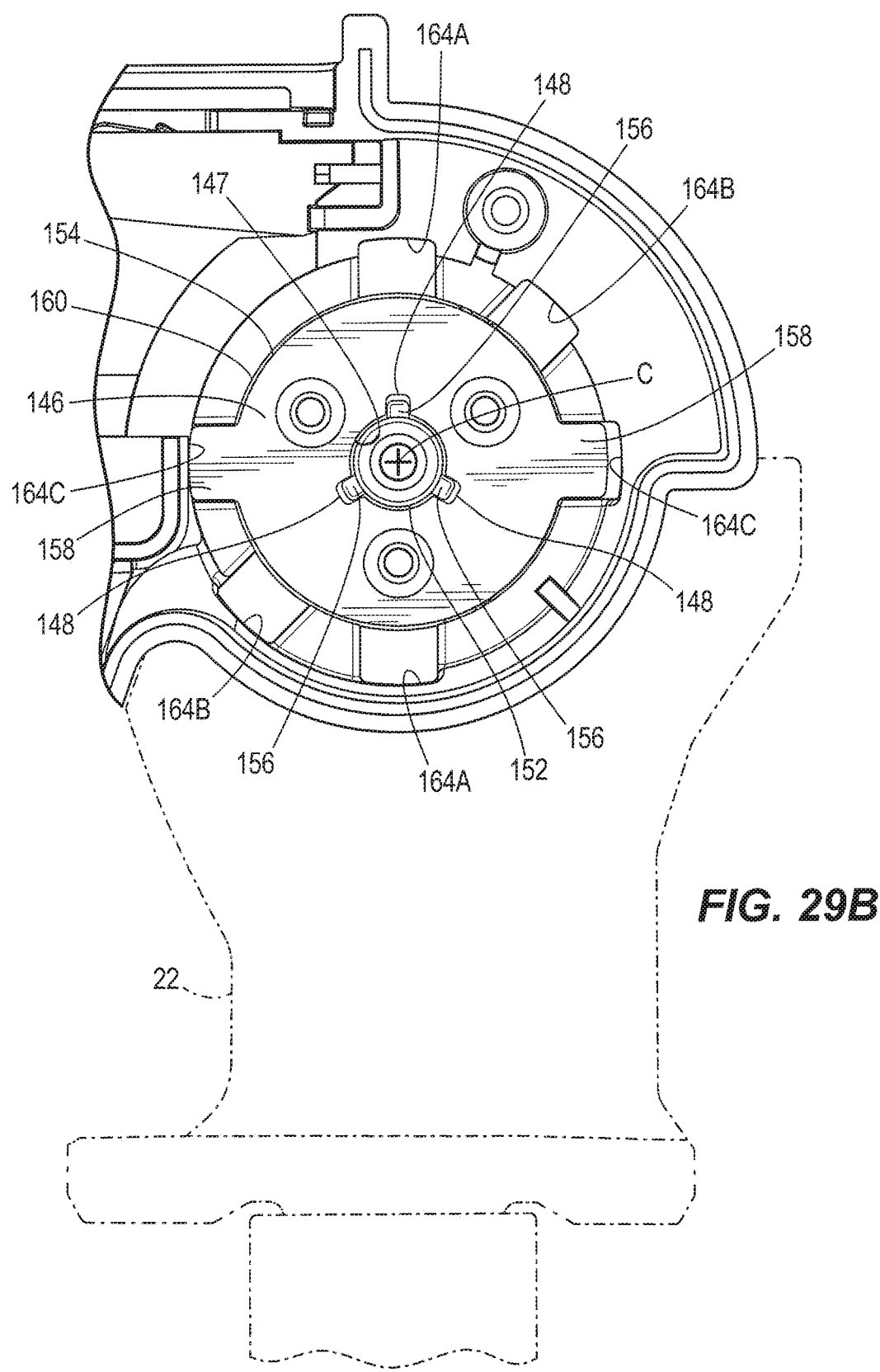
FIG. 29B is a cross-sectional view of another embodiment of the soldering tool of FIG. 1 in a third configuration.

In another embodiment of the soldering tool 10 shown in FIGS. 29A and 29B, the push button member 146 is locked for rotation with the head portion 22. The push button member 146 defines a central aperture 147 extending therethrough along pivot axis C and a plurality of grooves 148 that extend radially from the central aperture 147 and in a direction parallel to pivot axis C. The head portion 22 includes a hub 152 within head portion 22 that extends along pivot axis C and is arranged within the central aperture 147 of the push button member 146. The hub 152 has a plurality of protrusions 156 extending radially therefrom and positioned within the grooves 148 of the push button member 146. The grooves 148 and protrusions 156 are circumferentially equidistant from adjacent grooves 148 and protrusions 156 about the aperture 147 and hub 152, respectively. In the illustrated embodiment, there are three grooves 148 and three protrusions 156, but in other embodiments there could be more or less.

With continued reference to the embodiment shown in FIGS. 29A and 29B, the handle portion 18 has an internal wall 160 circumferentially surrounding the body 154 of the push button member 146. The wall 160 defines three pairs of internal notches or recesses 164A, 164B, 164C, with each pair having two notches being arranged 180 degrees away from one another. The push button member 146 has two detents 158 arranged 180 degrees from one another. Each of the notches or recesses 164A, 164B, 164C is sized to receive the detents 158 of the push button member 146 and correspond to different orientations of the head portion 22 relative to the handle portion 18, as shown in FIGS. 8-10. In alternative embodiments, the recesses 164A, 164B, 164C may be defined by the body of the push button member 146 and the detents 158 extend from the wall 160.

In the embodiment shown in FIGS. 29A and 29B, the compression spring 170 biases the push button member 146 into a first, biased, or locking position, in which the detents 158 are biased into engagement with one pair of the recesses 164A, 164B, 164C to lock the head portion 22 in one of the discrete orientations (FIGS. 8-10) relative to the handle portion 18. The push button member 146 may be manually depressed against the bias of the compression spring 170 into a second, depressed, or unlocking position, in which the detents 158 are disengaged from the recesses 164A, 164B, 164C to unlock the head portion 22 from the handle portion 18 and permit the head portion 22 to rotate relative to the handle portion 18. As the push button member 146 is depressed, the central aperture 147 permits the push button member 146 to move along hub 152 in a direction of pivot axis C while the protrusions 156 remain positioned in the grooves 148.

When the push button member 146 has been depressed and the head portion 22 is rotated between the positions shown in FIGS. 8-10, the hub 152 is also rotated. And, because the protrusions 156 of hub 152 are positioned in the grooves 148, the push button member 146 is caused to rotate with the head portion 22. When the operator releases the push button member 146, it is again biased into the first, locking position, in which the detents 158 are biased into engagement with one pair of the recesses 164A, 164B, 164C to lock the head portion 22 in one of the discrete orientations (FIGS. 8-10). Thus, in the embodiment shown in FIGS. 29A and 29B, the push button member 146 is rotatable between three positions along with the head portion 22, corresponding to the orientations shown in FIGS. 8-10. As shown in FIG. 29A, positioning the detents 158 in the recesses 164A corresponds to the orientation shown in FIG. 8 and as shown in FIG. 29B, positioning the detents 158 in the recesses 164C corresponds to the orientation shown in FIG. 10.

FIG. 8 illustrates the soldering tool 10 oriented in a first, soldering iron orientation. Specifically, the head portion 22, and thus the heating assembly 26, are oriented relative to the handle portion 18 such that the longitudinal axis B of the head portion 22 is generally coaxial with the longitudinal axis A of the handle portion 18. This orientation corresponds to the detent 158 of the push button member 146 being received in the first recess 178A.

FIG. 9 illustrates the soldering tool 10 oriented in a second, intermediate orientation. Specifically, the head portion 22, and thus the heating assembly 26, are oriented relative to the handle portion 18 of the housing 14 such that the longitudinal axis B of the head portion 22 forms an angle of approximately 45 degrees relative to the longitudinal axis A of the handle portion 18. This orientation corresponds to the detent 158 of the push button member 146 being received in the second recess 178B. In some embodiments, there may be additional recesses defining additional intermediate orientations in which the longitudinal axes A, B form various angles between 0 and 90 degrees (e.g., approximately 30 degrees and approximately 60 degrees).

FIG. 10 illustrates the soldering tool 10 oriented in a third, soldering gun orientation. Specifically, the head portion 22, and thus, the heating assembly 26, are oriented relative to the handle portion 18 of the housing 14 such that the longitudinal axis B of the head portion 22 is generally perpendicular to the longitudinal axis A of the handle portion 18. This orientation corresponds to the detent 158 of the push button member 146 being received in the third recess 178C.

In operation of the soldering tool 10, in order to provide power to the soldering tool 10 and heat the metal tip 82, one slides the mechanical actuator 106 from the first position (FIG. 11) toward the head portion 22 and into the second position (FIG. 12). The switch actuating member 114 actuates the electrical switch 110, thereby toggling into the "on" position. Accordingly, the controller 58 supplies an electrical current to the resistive heating element 94, thereby heating it and the metal tip 82 through conductive heat transfer from the heating element 94. While the mechanical actuator 106 is in the second position, one may facilitate continuous use of the soldering tool 10 by placing the detent 122 in the aperture 126. Once the detent 122 is received in the aperture 126 the mechanical actuator 106 is retained in the second position allowing one to release the mechanical actuator 106 without the electrical switch 110 being toggled to the "off" position, as described below. In some embodiments, once the heated metal tip 82 reaches a desirable temperature for performing soldering, the LED of the visual indicator 66 is illuminated to provide visual indication to the user. The user may then use the heated metal tip 82 to heat up and melt solder to be applied to or removed from a workpiece. During use, the battery fuel gauge 62 indicates to the user how much charge is remaining in the battery pack 46.

Figure 11:
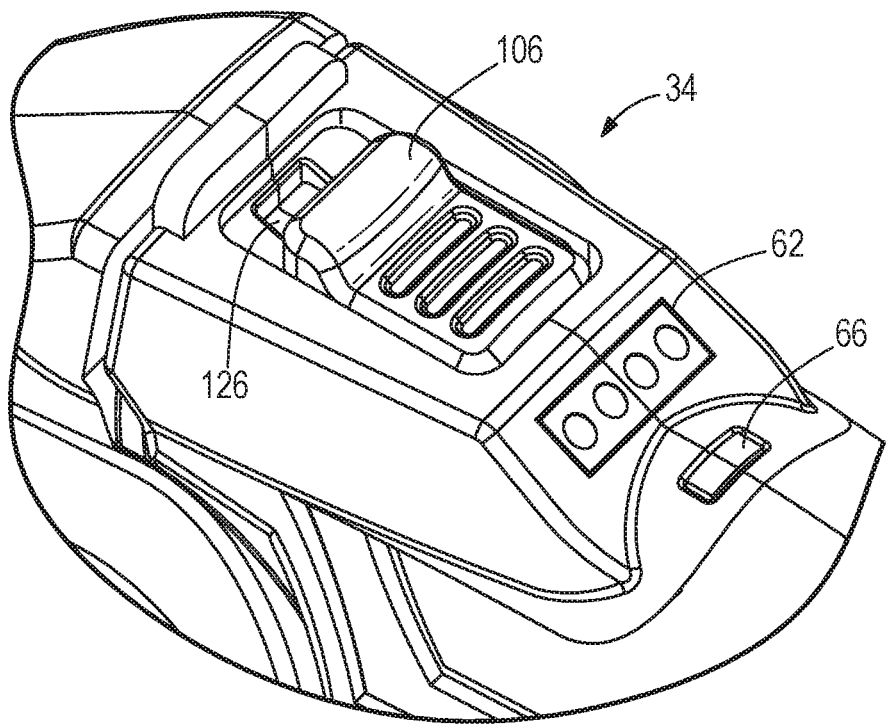
FIG. 11 is an enlarged perspective view of a power switch assembly of the soldering tool of FIG. 1, shown in a first, off position.
Figure 12:
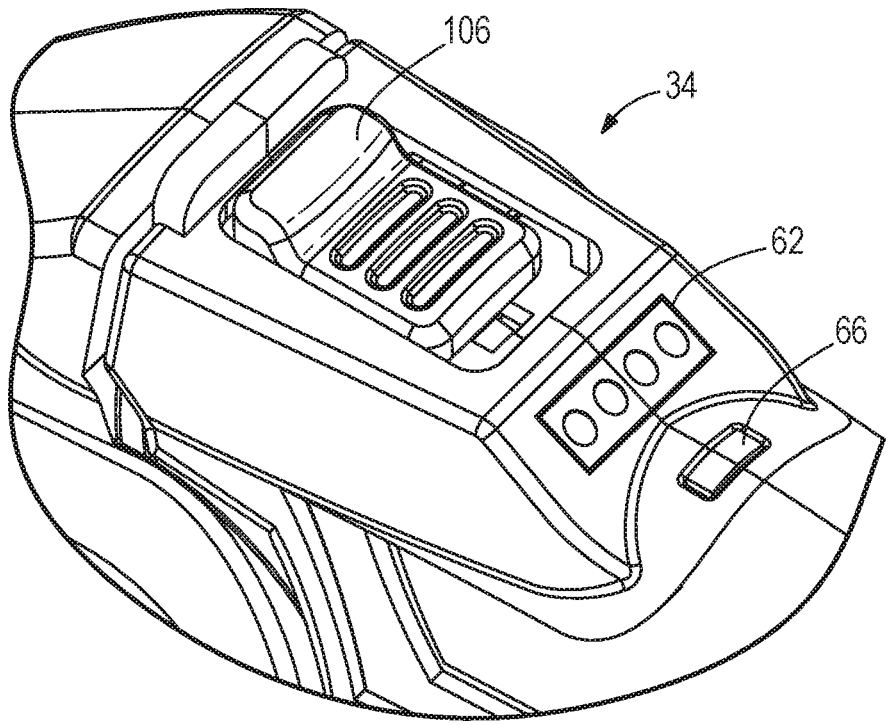
FIG. 12 is an enlarged perspective view of the power switch assembly of FIG. 11, shown in a second, on position.
Figure 13:
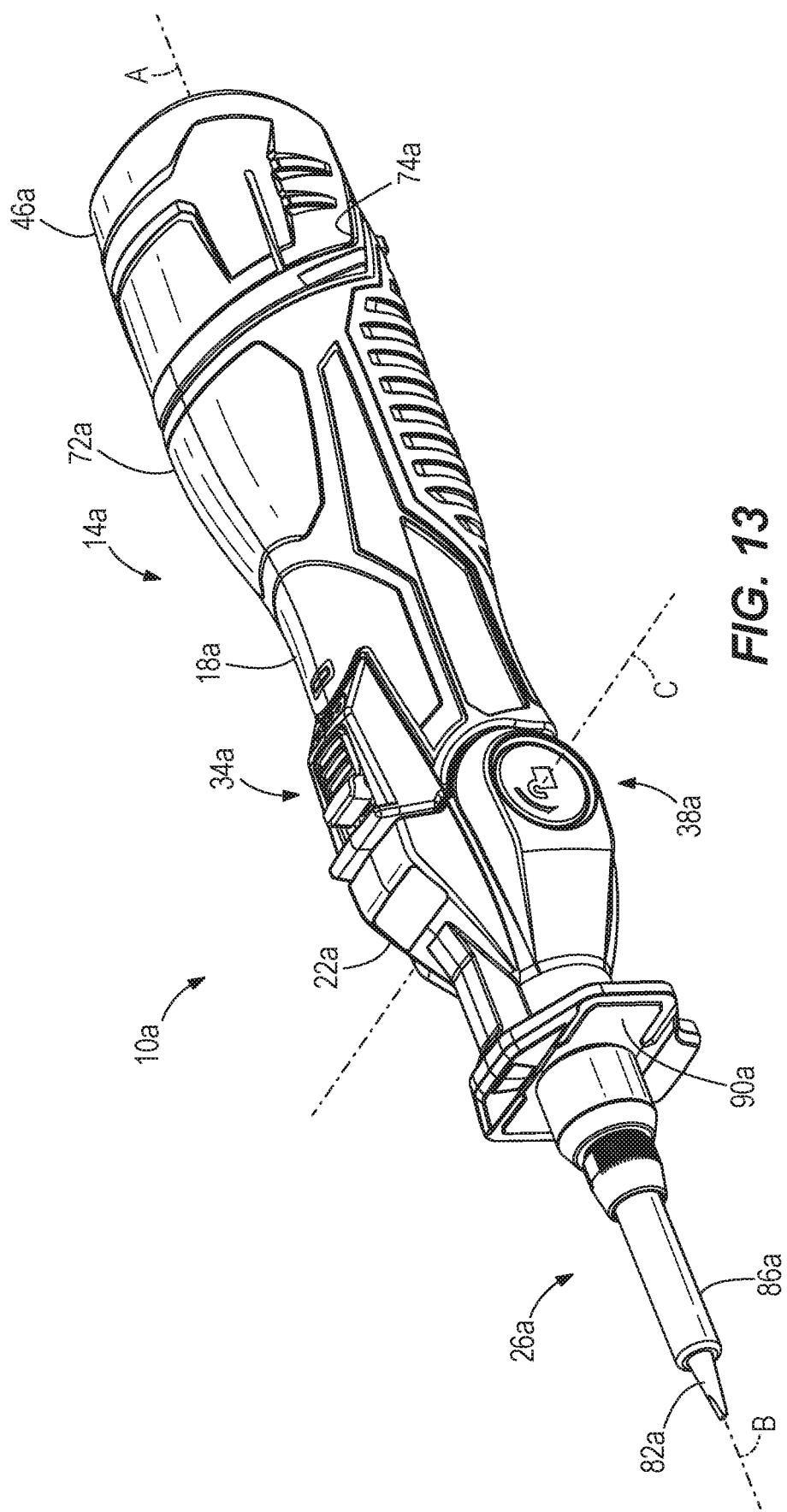
FIG. 13 is a perspective view of a soldering tool in accordance with another embodiment of the invention.

In order to deactivate the soldering tool 10, one releases the sliding mechanical actuator 106, which is biased by the actuator spring 118 to return to the first position (FIG. 11). As the sliding mechanical actuator 106 returns to the first position, the switch actuating member 114 no longer actuates the electrical switch 110, thus toggling the electrical switch 110 to the "off" position and causing the controller 58 to cut off the supply of current to the resistive heating element 94. If the detent 122 is received in the aperture 126 to retain the mechanical actuator 106 in the second position, one must first remove the detent 122 from the aperture 126 before the electrical switch 110 can be toggled to the "off" position. Once the detent 122 is removed from the aperture 126, one may then release the mechanical actuator 106 to allow the actuator spring 118 to bias the mechanical actuator 106 to return to the first position and toggle the electrical switch 110 to the "off" position.

As previously mentioned, depending on the situation or operation being performed, different orientations of the heated metal tip 82 relative to the handle portion 18 may be desirable. Accordingly, the soldering tool 10 may be quickly and easily switched between the various configurations shown in FIGS. 8-10. For example, when the soldering tool 10 is in the first, soldering iron orientation (FIG. 8), the soldering tool 10 may be switched into either the second, intermediate orientation (FIG. 9) or the third, soldering gun orientation (FIG. 10) by first manually depressing the push button member 146 against the bias of the compression spring 174 into the unlocking position (FIG. 7) such that the detent 158 is not received by any of the recesses 178A, 178B, 178C. While holding the push button member 146 against the bias of the compression spring 174, the user may then pivot the head portion 22 relative to the handle portion 18 of the housing 14 counterclockwise about the pivot axis C by either 45 degrees or 90 degrees to the second, intermediate orientation (FIG. 9) or the third, soldering gun orientation (FIG. 10), respectively. The user may then release the push button member 146, allowing the compression spring 174 to bias the push button member 146 back into the locking position (FIG. 6) such that the detent 158 is received in either the second recess 178B or third recess 178C to secure the head portion 22 relative to handle portion 18 of the housing 14.

Figure 7:
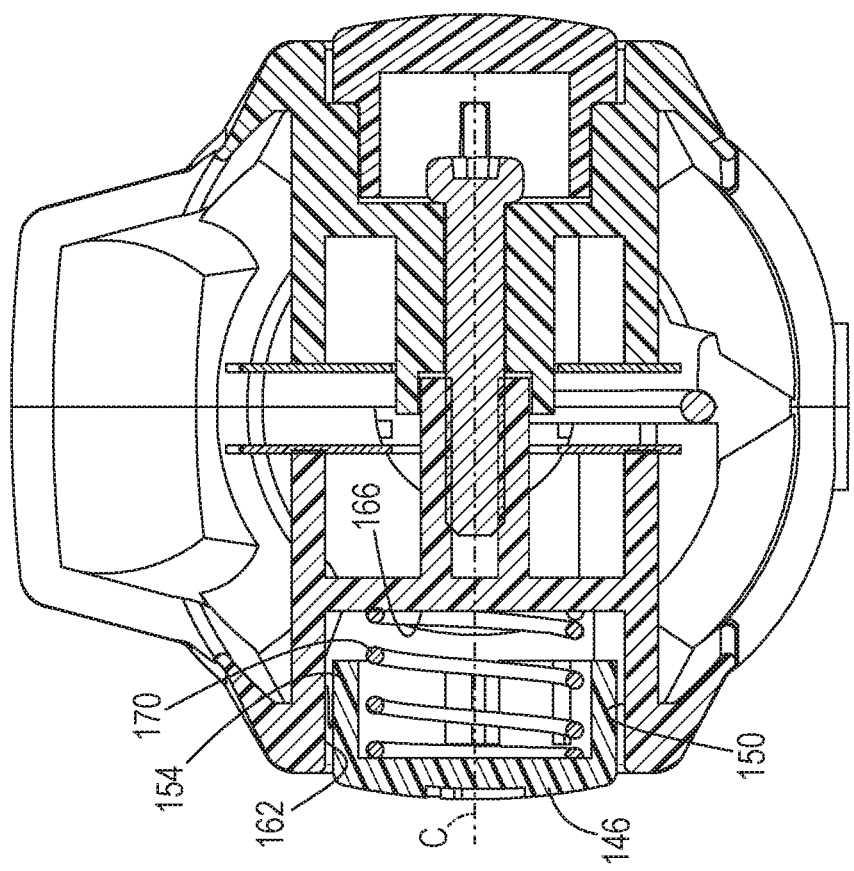
FIG. 7 is a cross-sectional view of the soldering tool of FIG. 1 through line 7-7 in FIG. 1, shown with the detent locking button in a second, depressed position.

Similarly, in order to return the soldering tool 10 to the first, soldering iron orientation (FIG. 8) from the second, intermediate orientation (FIG. 9) or the third, soldering gun orientation (FIG. 10), one depresses the push button member 146 against the bias of the compression spring 174 into the unlocking position (FIG. 7). The user can then pivot the head portion 22 relative to the handle portion 18 clockwise about the pivot axis C by either 45 degrees or 90 degrees until the head portion 22 is returned to the first, soldering iron orientation. The user can then release the push button member 146, allowing the compression spring 174 to bias the push button member into the locking position to secure the soldering tool 10 in the first, soldering iron orientation.

FIGS. 13-24 illustrate a soldering tool 10a in accordance with another embodiment of the invention. Like components and features are identified with like reference numerals plus the letter "a" and will not be described again in detail. The soldering tool 10a of FIGS. 13-24 is substantially similar to the soldering tool 10 of FIGS. 1-12. Accordingly, only differences in structure and manner of operation of the soldering tool 10a are described in detail below.

Figure 14:
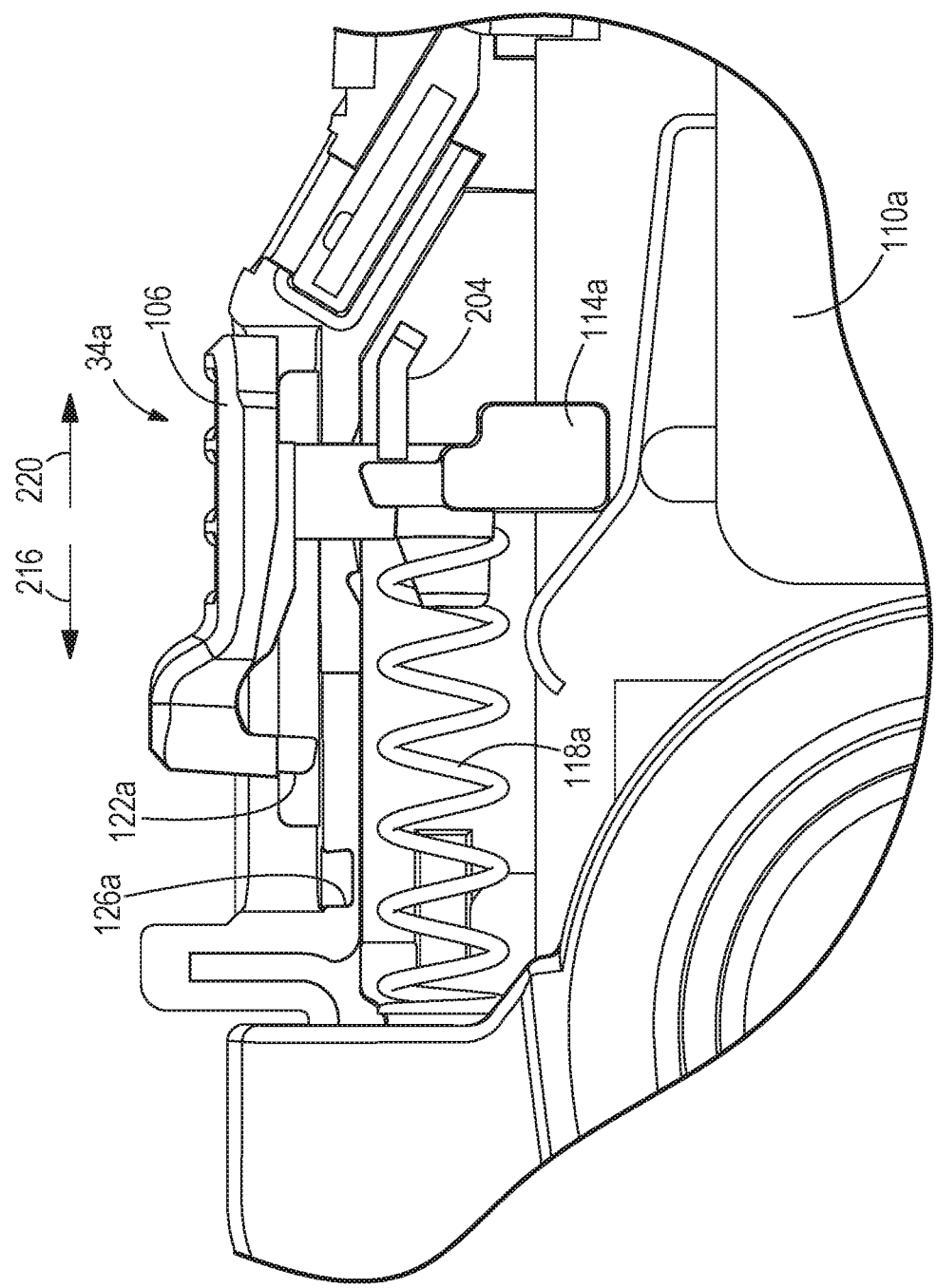
FIG. 14 is an enlarged side view of a power switch assembly of the soldering tool of FIG. 13, shown in a first position.
Figure 15:
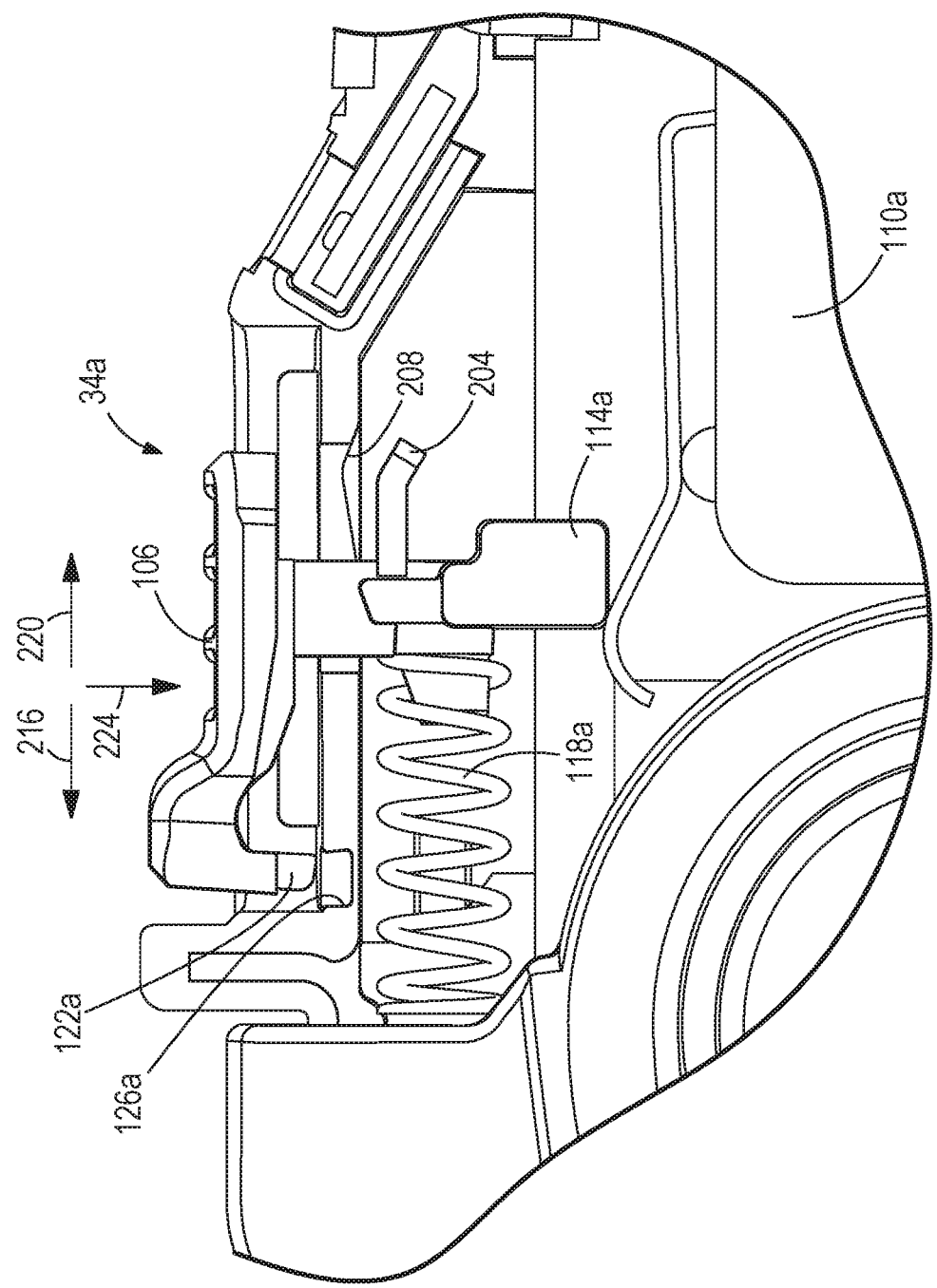
FIG. 15 is an enlarged side view of the power switch assembly of FIG. 14, shown in a second position.
Figure 16:
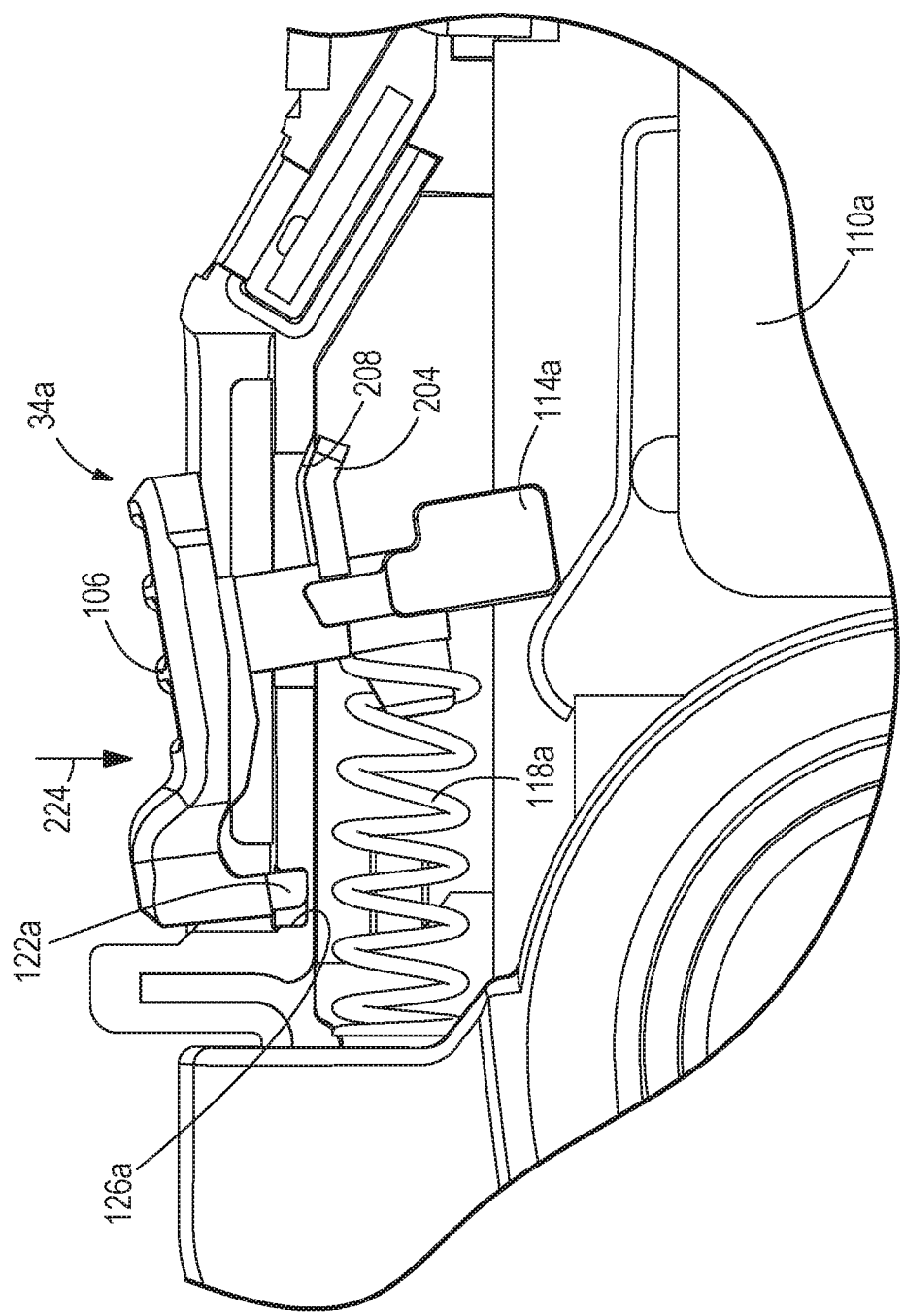
FIG. 16 is an enlarged side view of the power switch assembly of FIG. 14, shown in a third position.

With reference to FIGS. 14-16, the power switch assembly 34a includes a sliding mechanical actuator 106a, an electrical switch 110a, and a switch actuating member 114a extending from the mechanical actuator 106a for actuating the electrical switch 110. The power switch assembly 34a further includes an actuator spring 118a. The mechanical actuator 106a further includes an actuator detent 122a extending from a front end of the mechanical actuator 106a that is received in and engaged with a first locking aperture 126a defined on an external surface of the housing 14a. The mechanical actuator 106a further includes a rearward projection 204 extending from the mechanical actuator 106a within the housing 14a that is received in and engaged with a second locking aperture or recess 208 defined on an internal surface of the housing 14a (FIG. 16).

In operation, the mechanical actuator 106a is biased by the actuator spring 118a into a first position shown in FIG. 14. In the first position, the switch actuating member 114a does not actuate the electrical switch 110a, such that the electrical switch 110a is in an "off" state in which power is not provided to the heating element 94a. The mechanical actuator 106a may be slid in a forward direction 216 toward a front end of the soldering tool 10a to a second position shown in FIG. 15. In the second position, the switch actuating member 114a actuates the electrical switch 110a, toggling the electrical switch 110a to an "on" state in which power is provided to the heating element 94. If the mechanical actuator 106a is released by the user while in the second position, it is biased in a rearward direction 220 by the spring 118a back to the first position (FIG. 14). However, while the user holds the mechanical actuator 106a in the second position (FIG. 15), the front end of the mechanical actuator 106a may be pushed in a downward direction 224, pivoting the mechanical actuator 106a to a third, locked-on position shown in FIG. 16. In the third position, the actuator detent 122a is received in the first locking aperture 126a while the rearward projection 204 simultaneously is received in the second locking recess 208 to lock or retain the sliding mechanical actuator 106a in the third position, where the electrical switch 110a is maintained in an "actuated" or "on" state via the switch actuating member 114a.

Accordingly, the power switch assembly 34a provides a two-action lock that requires two actions to lock the soldering tool 10a in a powered on state: first, moving the mechanical actuator 106a forward to power on the soldering tool 10a, and second, pivoting the mechanical actuator 106a into a locked condition to maintain the soldering tool 10a in a powered on state. When the actuator 106a is in the third, locked-on position, the user may power off the soldering tool 10a by pressing the back end of the mechanical actuator 106a in the downward direction 224 causing the mechanical actuator 106a to pivot back to the second position (FIG. 15), disengaging the actuator detent 122a from the first locking aperture 126a and the rearward projection 204 from the second locking recess 208. Once in the second position, the mechanical actuator 106 is biased in the rearward direction 220 back to the first position (FIG. 14), where the switch actuating member 114a does not actuate the electrical switch 110a, thereby toggling the electrical switch 110a to an "off" state.

Figure 17:
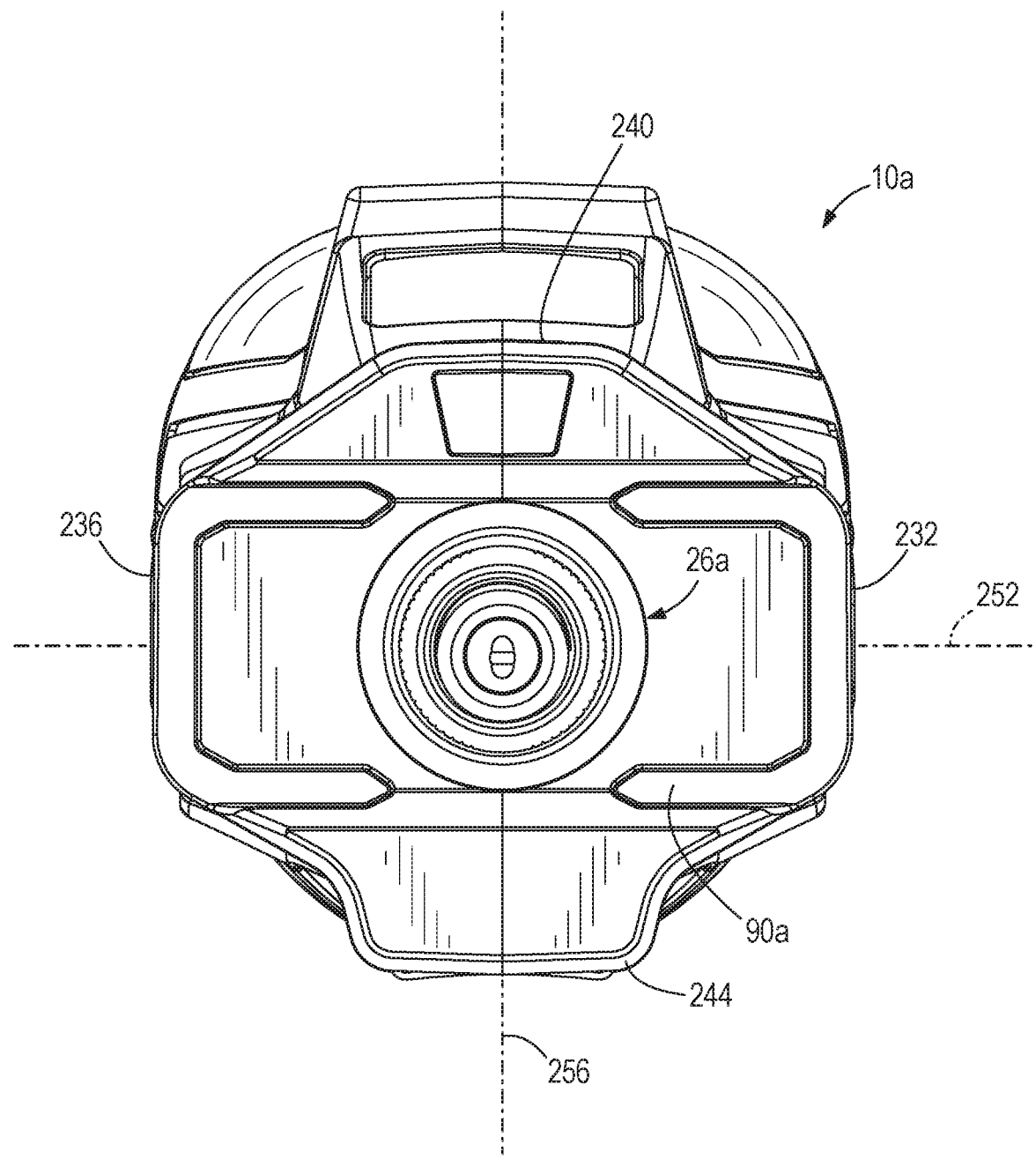
FIG. 17 is a front end view of the soldering tool of FIG. 13.
Figure 18:
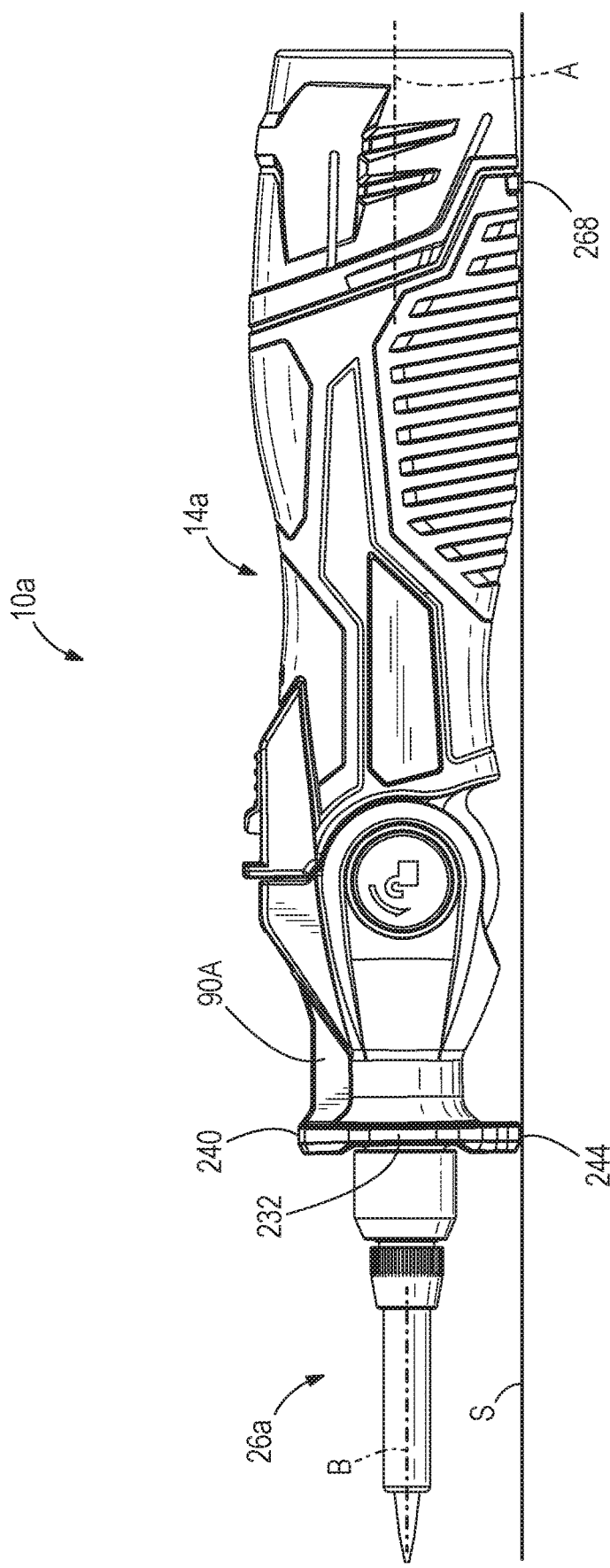
FIG. 18 is a side view of the soldering tool of FIG. 13 in a first configuration, supported by a first side of a collar of the soldering tool.
Figure 19:
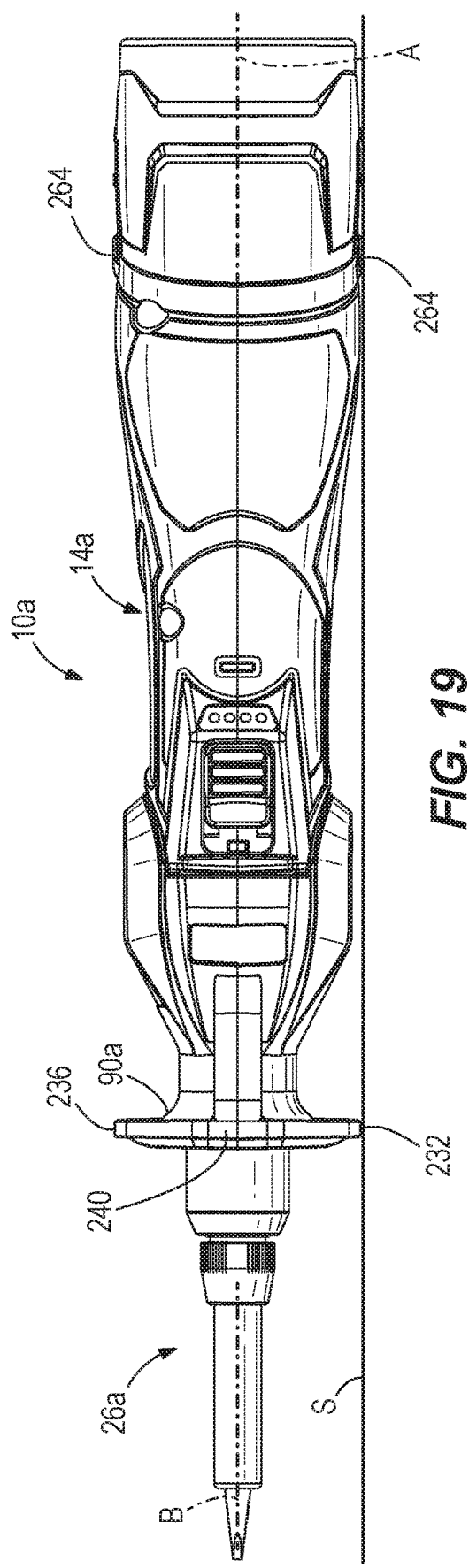
FIG. 19 is a side view of the soldering tool of FIG. 13 in the first configuration, supported by a second side of the collar.
Figure 20:
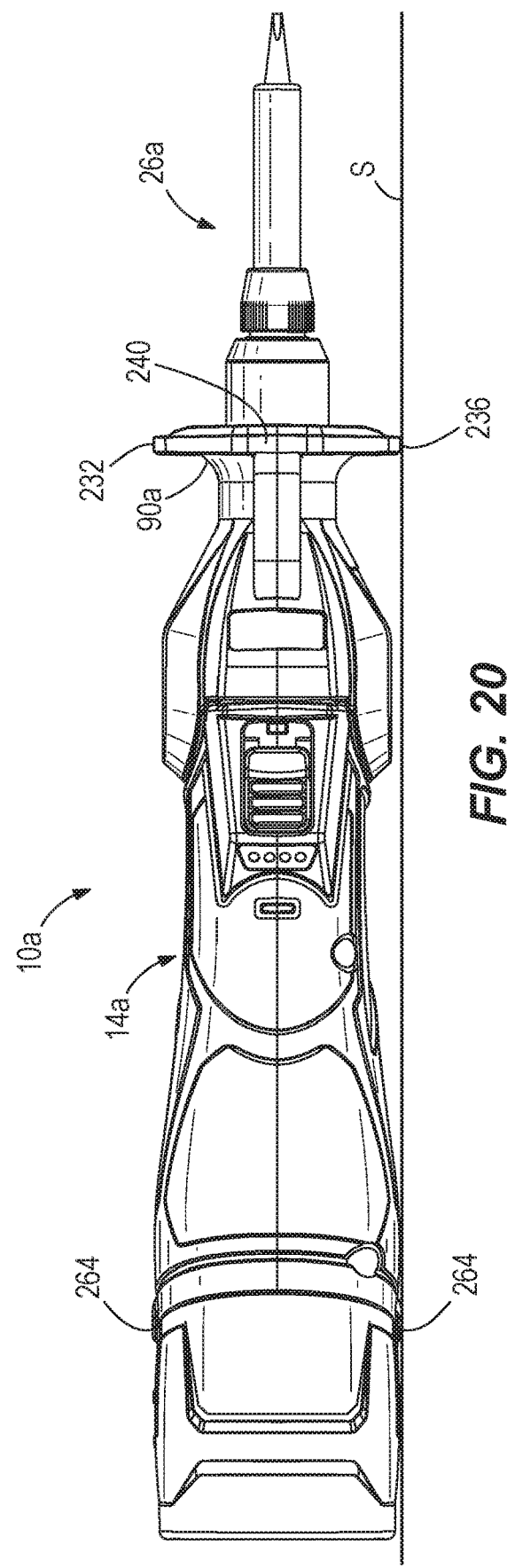
FIG. 20 is a side view of the soldering tool of FIG. 13 in the first configuration, supported by a third side of the collar.
Figure 21:
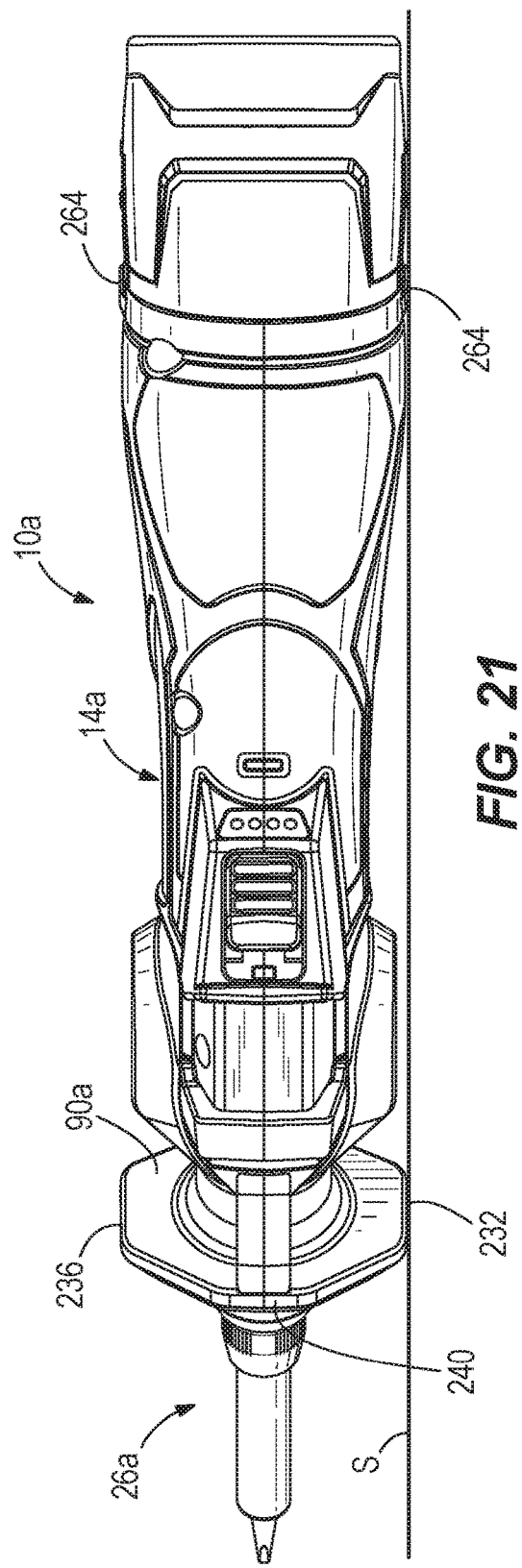
FIG. 21 a side view of the soldering tool of FIG. 13 in a second configuration, supported by the second side of the collar.
Figure 22:
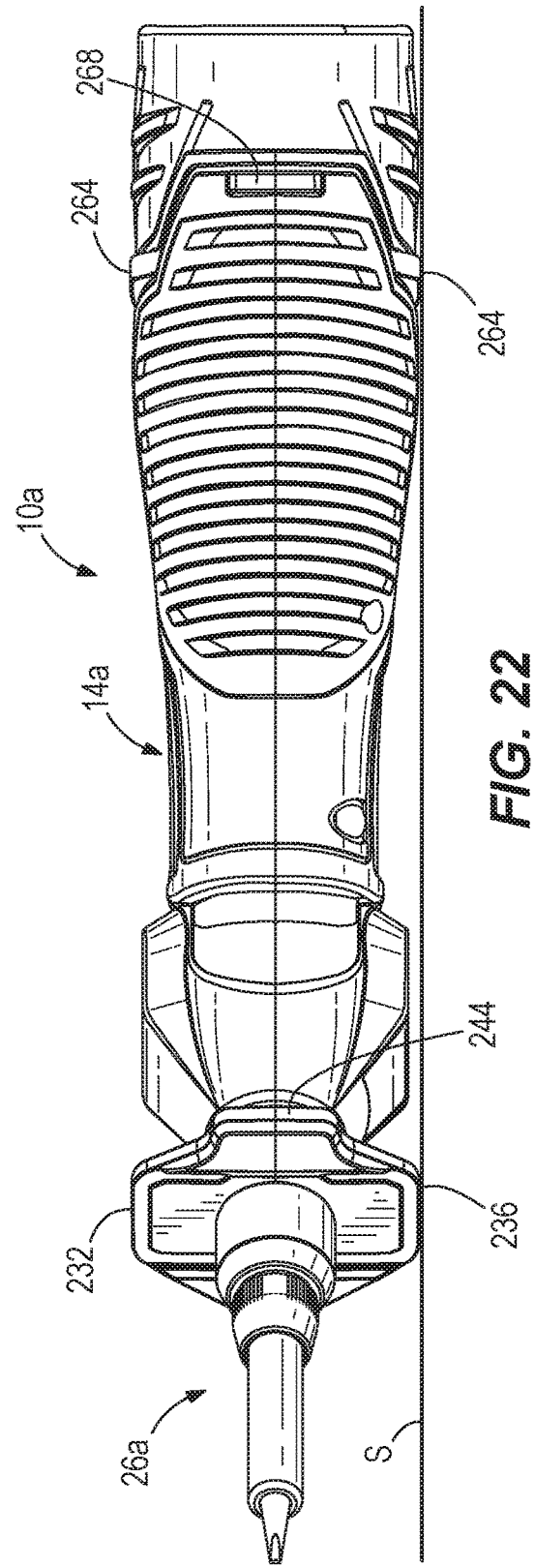
FIG. 22 is a side view of the soldering tool of FIG. 13 in the second configuration, supported by the third side of the collar.

With reference to FIG. 17, the collar or mounting portion 90a has first and second lateral sides 232, 236, and top and bottom sides 240, 244. The first and second lateral sides 232, 236 are spaced apart along a first collar axis 252, which is parallel to the pivot axis C, and extend parallel to a second collar axis 256 perpendicular to the first collar axis 252. The top and bottom sides 240, 244 are spaced apart along the second collar axis 256 and are generally parallel to the first collar axis 252. Each of the first and second lateral sides 232, 236 is spaced from the axis B along the first collar axis 252 the same distance that a lateral projection 264 extends from each of the corresponding lateral sides of the housing 14a away from the axis A (FIG. 19). Similarly, the bottom side 244 of the mounting portion 90a is spaced from the axis B the same distance as a bottom projection 268 extends from the bottom side of the housing 14a away from the axis A (FIG. 18). Accordingly, when the soldering tool 10a is in the first, soldering iron orientation, the soldering tool 10a may be supported on a surface S such that the heating assembly 26a is spaced from the surface S by a combination of the bottom side 244 of the mounting portion 90a and the bottom projection 268 extending from the housing 14a. Alternatively, the tool 10a may be supported on the surface S by either of the first or second lateral sides 232, 236 of the mounting portion 90a and the corresponding lateral projection 264 extending from the housing 14a, as shown in FIGS. 19-20. When the soldering tool 10a is in either the second, intermediate orientation or the third, soldering gun orientation, the soldering tool 10a may be supported on the surface by one of the first or second lateral sides 232, 236 and the corresponding lateral projection 264 of the housing 14a, as shown in FIGS. 21-24.

Figure 25:
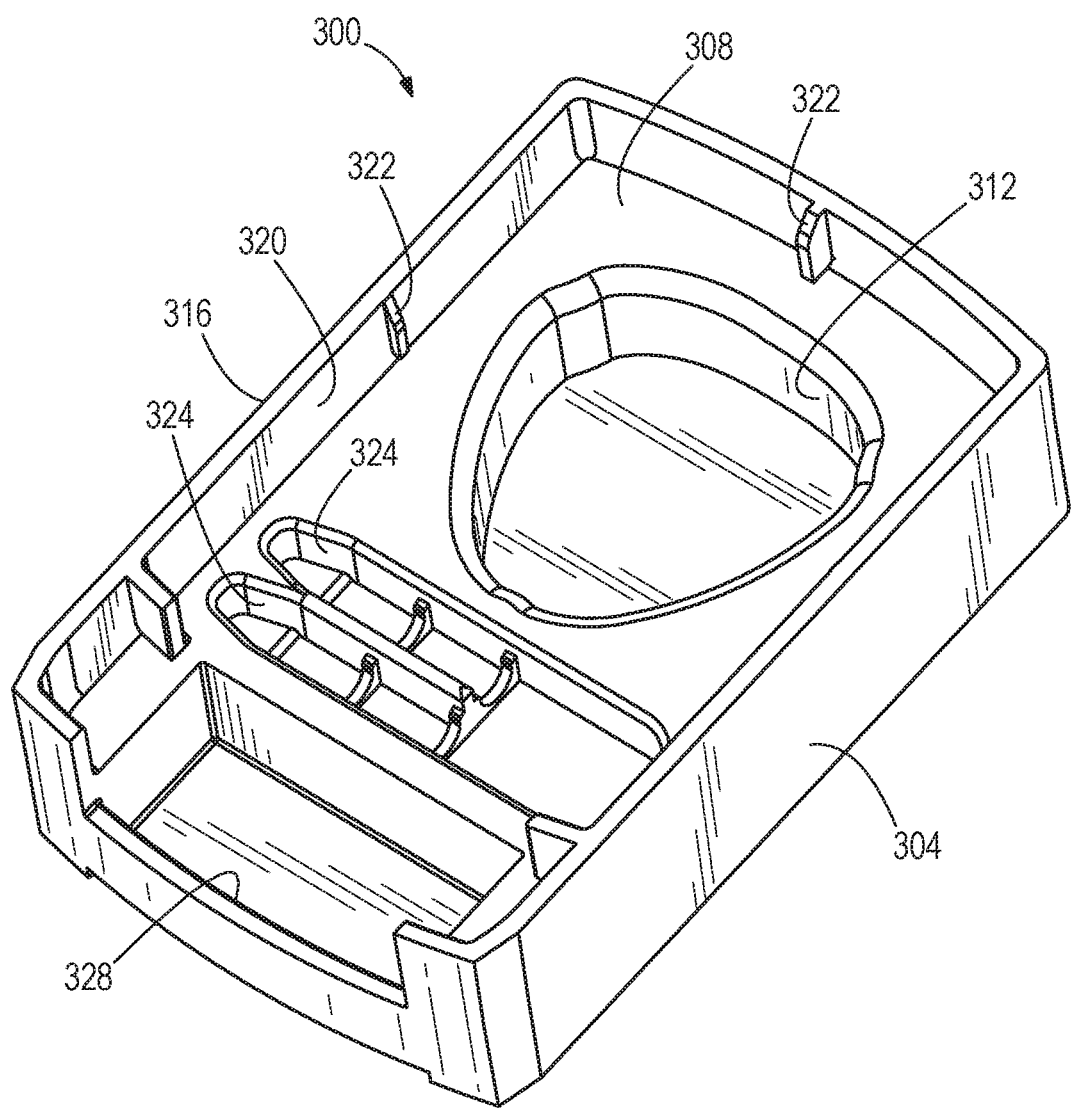
FIG. 25 is a perspective view of a stand in accordance with an embodiment of the invention.
Figure 27:
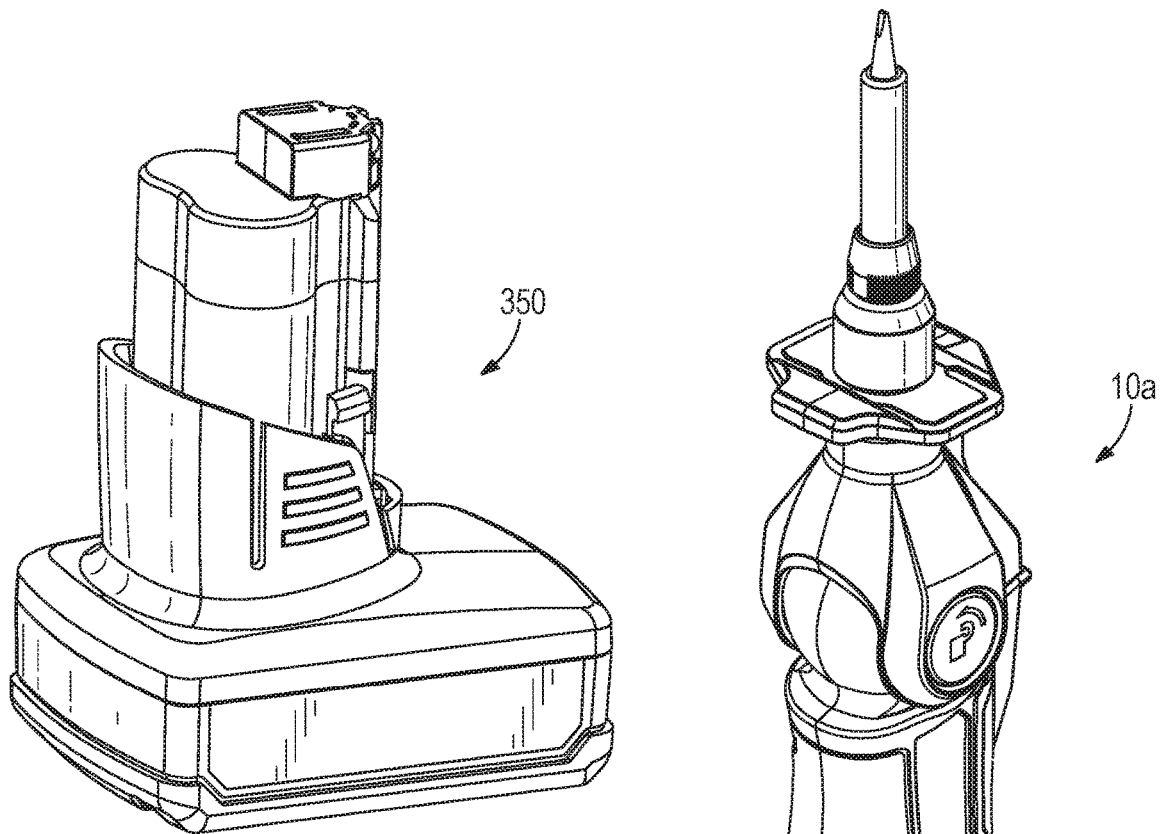
FIG. 27 is a perspective view of another battery, which is also receivable in the stand of FIG. 25, for use with the soldering tool of FIG. 13.
Figure 26:
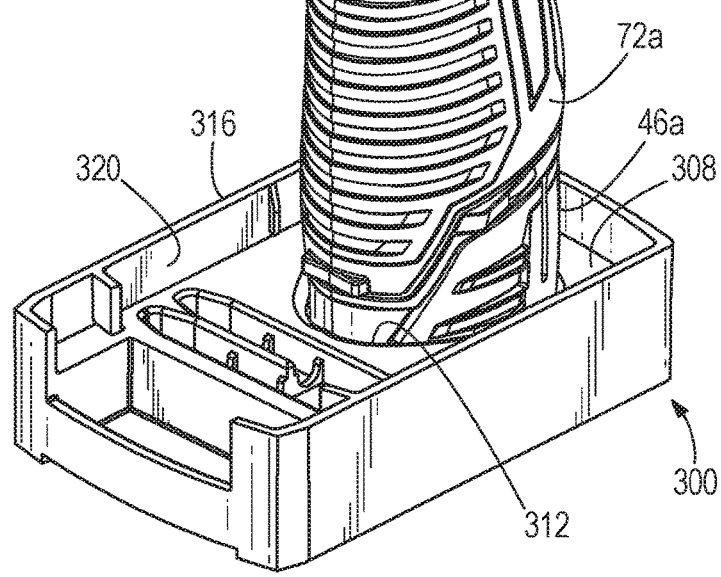
FIG. 26 is a perspective view of the stand of FIG. 25 receiving a battery of the soldering tool of FIG. 13 to support the soldering tool.
Figure 28:
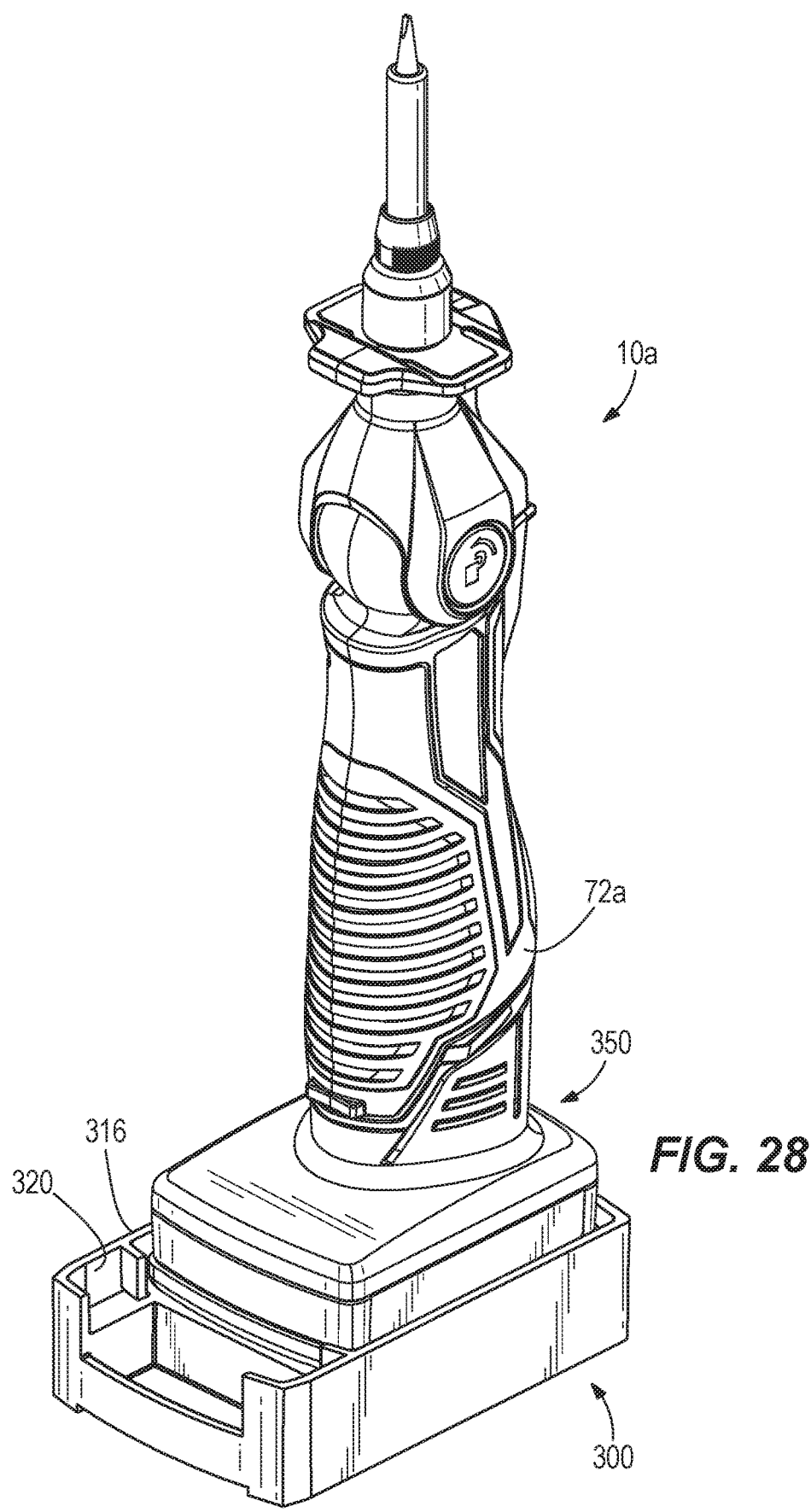
FIG. 28 is a perspective view of the stand of FIG. 25 receiving the battery of FIG. 27 while attached to the soldering tool of FIG. 13 to support the soldering tool of FIG. 13.

FIG. 25 illustrates a stand 300 for supporting the soldering tool 10a of FIGS. 13-24, as shown in FIG. 26. The stand 300 includes a body 304 defining a top surface 308. The top surface 308 further defines a first battery recess 312. The first battery recess 312 is shaped to receive a first rechargeable battery pack 46a having a first footprint or outer peripheral shape to support the soldering tool 10a when the first rechargeable battery pack 46a is attached, as shown in FIG. 26. Alternatively, the first battery recess 312 may support the first rechargeable battery pack 46a detached from the soldering tool 10a. A peripheral wall 316 extends upward from the top surface 308 to define a second battery recess 320 sized and shaped to receive a second rechargeable battery pack 350 (FIG. 27) having a second footprint or outer peripheral shape to support the soldering tool 10a when the second rechargeable battery pack 350 is received in the battery receptacle 74a (not shown). Alternatively, the second battery recess 320 may support the second rechargeable battery pack 350 detached from the soldering tool 10a. Multiple ribs 322 extend inward from the peripheral wall 316. Each of the first and second battery recesses 312, 320 has a different shape for receiving the first and second battery packs 46a, 350, which are correspondingly shaped. In the illustrated embodiment, the first battery recess 312 generally has a rounded triangular shape, while the second battery recess 320 has a generally rectangular shape. In alternate embodiments, the first and second battery recesses 312, 320 may have another shape (e.g., square, triangle, rectangle, circular, etc.). In the illustrated embodiment, the first battery recess 312 is defined in the top surface 308 while the peripheral wall 316 extends around the top surface 308. As such, the first battery recess 312 is nested inside the second battery recess 320.

With continued reference to FIG. 25, the body 304 further defines a plurality of soldering tip recesses 324 in the top surface 308 sized to hold various soldering tips. The soldering tip recesses 324 are sized so that the second battery recess 320 can receive the second battery 350 while soldering tips are received within the soldering tip recesses 324. The stand body 304 further defines a tray 328 for holding and organizing additional pieces and components.

Various features of the invention are set forth in the following claims.

What is claimed is:

1. A soldering tool comprising:
a housing including
a handle portion defining a first axis, and
a head portion coupled to the handle portion and defining a second axis, the head portion movable relative to the handle portion between a first orientation in which the second axis is coaxial with the first axis, and a second orientation in which the second axis is non-coaxial with the first axis;
a heating element coupled to the head portion for movement therewith; and
a locking mechanism for selectively and alternatively locking the head portion with respect to the handle portion in the first orientation or second orientation; and
a mounting portion to couple the heating element to the head portion, the mounting portion including a first mounting side that is spaced from the second axis by a distance,
wherein the handle portion includes a first handle side that is spaced from the first axis by the distance, such that when the head portion is in the first orientation or the second orientation, the soldering tool is supportable on a surface by a combination of the first mounting side and the first handle side while the heating element is parallel to the surface and spaced from the surface by the distance.

2. The soldering tool of claim 1, wherein the head portion is movable relative to the handle portion between the first orientation, the second orientation, and a third orientation that is different from the second orientation and in which the second axis is non-coaxial with the first axis.

3. The soldering tool of claim 2, wherein in the second orientation, the first axis is perpendicular to the second axis and in the third orientation, the first axis defines an acute angle with respect to the second axis.

4. The soldering tool of claim 1, wherein the mounting portion includes a second mounting side that is perpendicular to the first mounting side and spaced from the second axis by a second distance, and the handle portion includes a second handle side that is perpendicular to the first handle side and spaced from the first axis by the second distance, such that when the head portion is in the first orientation, the soldering tool is supportable on the surface by a combination of the second mounting side and the second handle side while the heating element is parallel to the surface and spaced from the surface by the second distance.

5. The soldering tool of claim 4, wherein the mounting portion includes a third mounting side that is parallel to and opposite the first mounting side and spaced from the second axis by the distance, and the handle portion includes a third handle side that is parallel to and opposite the first handle side and spaced from the first axis by the distance, such that when the head portion is in the first orientation, the second orientation, or the third orientation, the soldering tool is supportable on the surface by a combination of the third mounting side and the third handle side while the heating element is parallel to the surface and spaced from the surface by the distance.

6. The soldering tool of claim 1, wherein the locking mechanism includes a push button aperture defined by a wall in the housing, the wall having a detent, and wherein the locking mechanism includes a push button member having a body defining a plurality of recesses sized to receive the detent.

7. The soldering tool of claim 1, wherein the locking mechanism includes a push button member having a detent and a push button aperture defined by a wall in the housing, the wall defining a plurality of recesses sized to receive the detent.

8. The soldering tool of claim 7, wherein the head portion is pivotable relative to the handle portion about a pivot axis defined by the push button member and push button aperture.

9. The soldering tool of claim 8, wherein the housing includes a spring seating surface within the push button aperture and the locking mechanism further includes a compression spring within the push button aperture and between the push button member and the spring seating surface, the compression spring biasing the push button member into a locking position in which the detent is engaged with one of the plurality of recesses to lock the head portion into the first orientation or the second orientation with respect to the handle portion.

10. The soldering tool of claim 9, wherein the push button member is depressible against the bias of the compression spring into an unlocking position in which the detent is disengaged from the plurality of recesses to permit relative rotation between the head portion and the handle portion about the pivot axis.

11. The soldering tool of claim 10, wherein the head portion includes the wall defining the plurality of recesses.

12. The soldering tool of claim 10, wherein the handle portion includes the wall defining the plurality of recesses.

13. The soldering tool of claim 1, wherein the housing includes a visual indicator with a light source, and wherein the visual indicator provides a first visual indication when the soldering tool is powered on, a second visual indication when the heating element has been heated to a desired temperature, and a third visual indication when the soldering tool has been powered off and the heating element is still hot.

14. The soldering tool of claim 1, further comprising a work light to illuminate a workpiece during operation of the soldering tool.

15. The soldering tool of claim 1, further comprising a controller and a power switch assembly on the housing, the power switch assembly including a sliding mechanical actuator, an electrical switch electrically connected to the controller, and a switch actuating member extending from the mechanical actuator, wherein the sliding mechanical actuator is slideable between a first position in which the switch actuating member does not actuate the electrical switch so that power is not provided to the heating element, and a second position in which the switch actuating member actuates the electrical switch so that power is provided to the heating element.

16. The soldering tool of claim 15, further comprising an actuator spring that biases the sliding mechanical actuator towards the first position, and wherein the housing defines a first locking aperture and the sliding mechanical actuator includes an actuator detent, and wherein when the sliding mechanical actuator is in the second position, the sliding mechanical actuator is depressible toward the housing, such that the actuator detent is received in the first locking aperture to retain the sliding mechanical actuator in a third position in which the sliding mechanical actuator is locked-on and the switch actuating member actuates the electrical switch so that power is provided to the heating element.

17. The soldering tool of claim 16, wherein the sliding mechanical actuator includes a projection and the housing defines a second locking aperture, and wherein when the sliding mechanical actuator is locked-on in the third position, the projection is received in the second locking aperture.

18. The soldering tool of claim 1, wherein the housing includes a battery attachment portion, and wherein the soldering tool further comprises a power tool battery pack removably coupled to the battery attachment portion to provide power to heat the heating element, the power tool battery pack also being connectable to other power tools to provide power thereto.

19. The soldering tool of claim 18, further comprising a controller, and wherein the housing includes a battery fuel gauge that is electrically connected to the controller and that provides a visual indication of the amount of charge remaining in the battery pack based on an electrical signal received from the controller.

20. A soldering tool comprising:
a housing including
a handle portion defining a first axis and including a battery attachment portion, and
a head portion coupled to the handle portion and defining a second axis, the head portion movable relative to the handle portion between a first orientation in which the second axis is coaxial with the first axis, and a second orientation in which the second axis is non-coaxial with the first axis;
a heating element coupled to the head portion for movement therewith;
a mounting portion to couple the heating element to the head portion, the mounting portion including a first mounting side that is spaced from the second axis by a distance; and
a power tool battery pack removably coupled to the battery attachment portion of the housing to provide power to heat the heating element, the power tool battery pack also being connectable to other power tools to provide power thereto,
wherein the handle portion includes a first handle side that is spaced from the first axis by the distance, such that when the head portion is in the first orientation or the second orientation, the soldering tool is supportable on a surface by a combination of the first mounting side and the first handle side while the heating element is parallel to the surface and spaced from the surface by the distance.

21. The soldering tool of claim 20, further comprising a controller, and wherein the housing includes a battery fuel gauge that is electrically connected to the controller and that provides a visual indication of the amount of charge remaining in the battery pack based on an electrical signal received from the controller.

22. The soldering tool of claim 20, wherein the power tool battery pack is a lithium-ion power tool battery pack.

* * * * *